(12) United States Patent
Oguro et al.

(10) Patent No.: US 6,198,589 B1
(45) Date of Patent: Mar. 6, 2001

(54) VIDEO TAPE RECORDING APPARATUS

(75) Inventors: Masaki Oguro, Tokyo; Masato Yamaguchi; Yoichirou Senshu, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/171,175

(22) Filed: Dec. 22, 1993

(30) Foreign Application Priority Data

Dec. 24, 1992 (JP) .................................................. 4-344192
Jun. 16, 1993 (JP) .................................................. 5-145001

(51) Int. Cl.$^7$ .................................................. G11B 15/18
(52) U.S. Cl. .................................................. 360/72.2
(58) Field of Search .............................. 360/49, 53, 72.1, 360/72.2

(56) References Cited

U.S. PATENT DOCUMENTS

| | | | |
|---|---|---|---|
| 4,011,587 | 3/1977 | Arter et al. | 360/62 |
| 4,811,124 | * 3/1989 | Dujari et al. | 360/49 |
| 4,833,663 | * 5/1989 | Satah et al. | 360/49 |
| 5,161,072 | * 11/1992 | Ai | 360/53 |
| 5,341,251 | * 8/1994 | Fincher et al. | 360/72.2 |
| 5,359,468 | * 10/1994 | Rhodes et al. | 360/53 |

FOREIGN PATENT DOCUMENTS

| | | |
|---|---|---|
| 0277549 A2 | 8/1988 | (EP) . |
| 2105087 | 3/1983 | (GB) . |

OTHER PUBLICATIONS

QIC Development Standard Revision K, Serial Recorded Magnetic Tape Cartridge for Information Interchange, Jun. 20, 1991.*

QIC Development Standard Revision C, Serial Recorded Cartridge for Information Interchange, Feb. 26, 1992, pp. 33–34.*

Patent Abstracts of Japan vol. 16, No. 305 (p–1380), Jul. 6, 1992 & JP-A-04082054 (Alps Electric co., LTD), Mar. 16, 1992, *abstract*.

Patent Abstracts of Japan vol. 14, No. 189 (p–1037), Apr. 17, 1990 & JP-A-02033773 (Pioneer Electronic Corp.), Feb. 2, 1990, *abstract*.

Patent Abstracts of Japan vol. 15, No. 41 (p–1160), Jan. 31, 1991 & JP-A-02276047 (Hitachi LTD), Nov. 9, 1990, *abstract*.

Patent Abstracts of Japan vol. 14, No. 40 (p–0995), Jan. 25, 1990 & JP-A-01273255 (Sanyo Elec. Co., LTD), Nov. 1, 1989, *abstract*.

* cited by examiner

Primary Examiner—Hoa T. Nguyen
Assistant Examiner—K. Wong
(74) Attorney, Agent, or Firm—Frommer Lawrence & Haug, LLP.; William S. Frommer

(57) ABSTRACT

Magnetic recording apparatus are provided for recording signals on a magnetic tape. A recording head records signals in successive tracks on the tape and a tape transport transports a magnetic tape past the recording head in a recording direction. In one embodiment, absolute track addresses are recorded in at least some of the tracks, the absolute track address of each track corresponding to a distance of the track from a start position of the magnetic tape. Recording is initiated from a track having a predetermined absolute track address corresponding to a predetermined distance from the start position. In a further embodiment, the tape transport transports the tape initially by a distance necessary to establish a stable running state, and thereafter transports the tape a further distance while recording reproduction control signals so that during reproduction a stable running state may be achieved. Thereafter, information to be output is recorded.

5 Claims, 27 Drawing Sheets

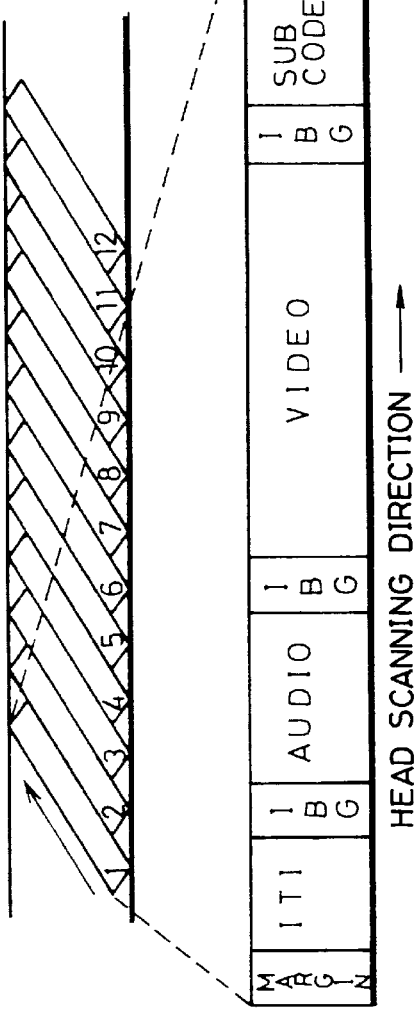
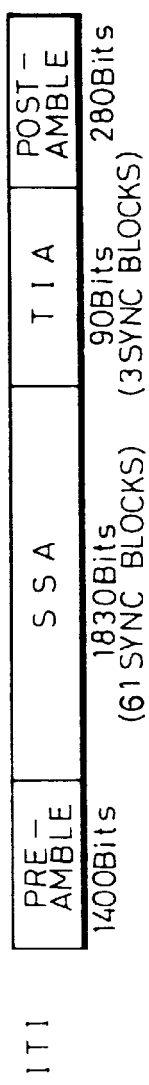
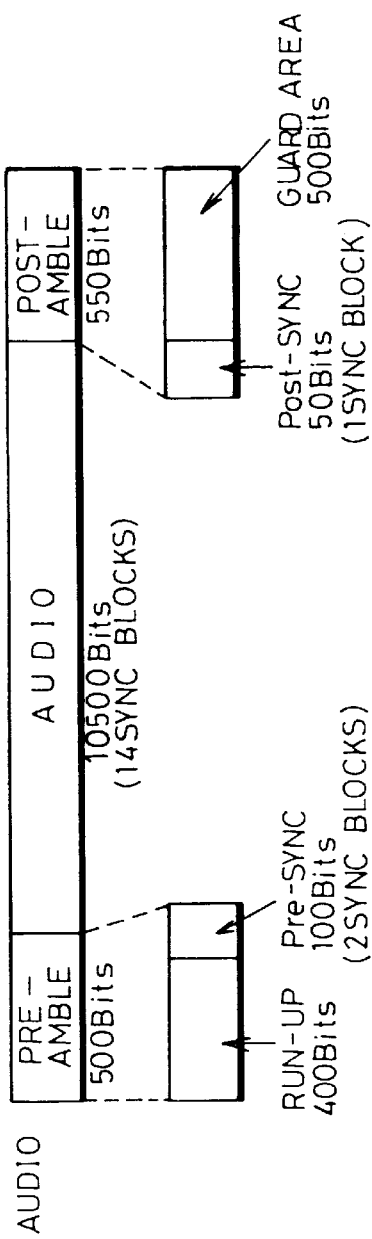
FIG. 5A
FIG. 5B
FIG. 5C
FIG. 5D

FIG. 11

SUBCODE

| | 2 Bytes | | 3 Bytes | | | 5 Bytes | 2 Bytes | |
|---|---|---|---|---|---|---|---|---|
| | SYNC | SYNC | ID0 | ID1 | IDP | Subcode Data | Parity | Parity |
| SYNC No. 0 | | | PR<br>AP3 2<br>AP3 1<br>AP3 0<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | | | |
| SYNC No. 1 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | | | |
| SYNC No. 2 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | | | |
| SYNC No. 3 | | | PR<br>RSV<br>RSV<br>RSV<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | | | |
| SYNC No. 4 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | | | |
| SYNC No. 5 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | | | |
| SYNC No. 6 | | | PR<br>AP3 2<br>AP3 1<br>AP3 0<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | | | |
| SYNC No. 7 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | | | |
| SYNC No. 8 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | | | |
| SYNC No. 9 | | | PR<br>RSV<br>RSV<br>RSV<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | | | |
| SYNC No. 10 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | | | |
| SYNC No. 11 | | | PR<br>APT 2<br>APT 1<br>APT 0<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | | | |

[AAUX]

| TRACK NO. → | 1 | 2 | 3 | 4 | 5 | 6 | 7 | 8 | 9 | 10 |
|---|---|---|---|---|---|---|---|---|---|---|
| 10 | 55 |  | 55 |  | 55 |  | 55 |  | 55 |  |
| 9 | 54 |  | 54 |  | 54 |  | 54 |  | 54 |  |
| 8 | 53 |  | 53 |  | 53 |  | 53 |  | 53 |  |
| 7 | 52 | 55 | 52 | 55 | 52 | 55 | 52 | 55 | 52 | 55 |
| 6 | 51 | 54 | 51 | 54 | 51 | 54 | 51 | 54 | 51 | 54 |
| 5 | 50 | 53 | 50 | 53 | 50 | 53 | 50 | 53 | 50 | 53 |
| 4 |  | 52 |  | 52 |  | 52 |  | 52 |  | 52 |
| 3 |  | 51 |  | 51 |  | 51 |  | 51 |  | 51 |
| 2 |  | 50 |  | 50 |  | 50 |  | 50 |  | 50 |

↑ PACK NO.

50~55 : AAUX

FIG. 17

| Word Name | | MSB | | LSB |
|---|---|---|---|---|
| PC0 | (ITEM) | | | |
| PC1 | (DATA) | | | |
| PC2 | | | | |
| PC3 | | | | |
| PC4 | | | | |

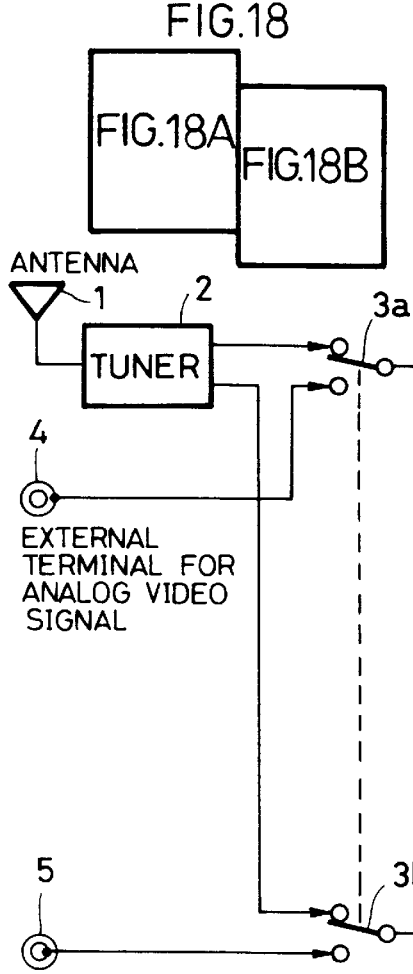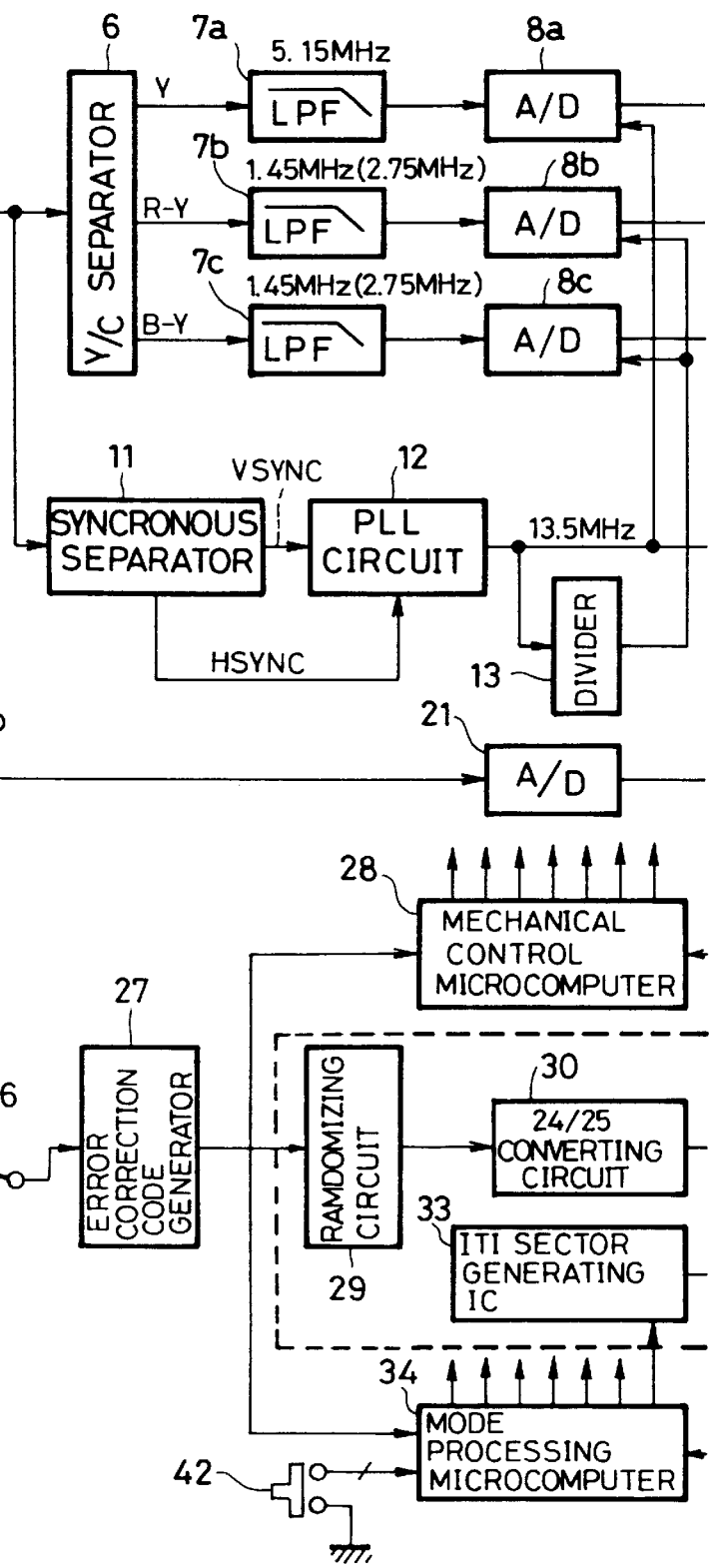
FIG. 18A

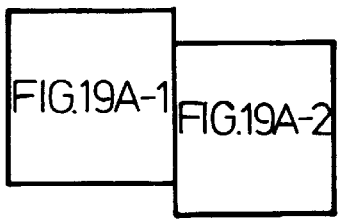
FIG. 19A
FIG. 19A-1
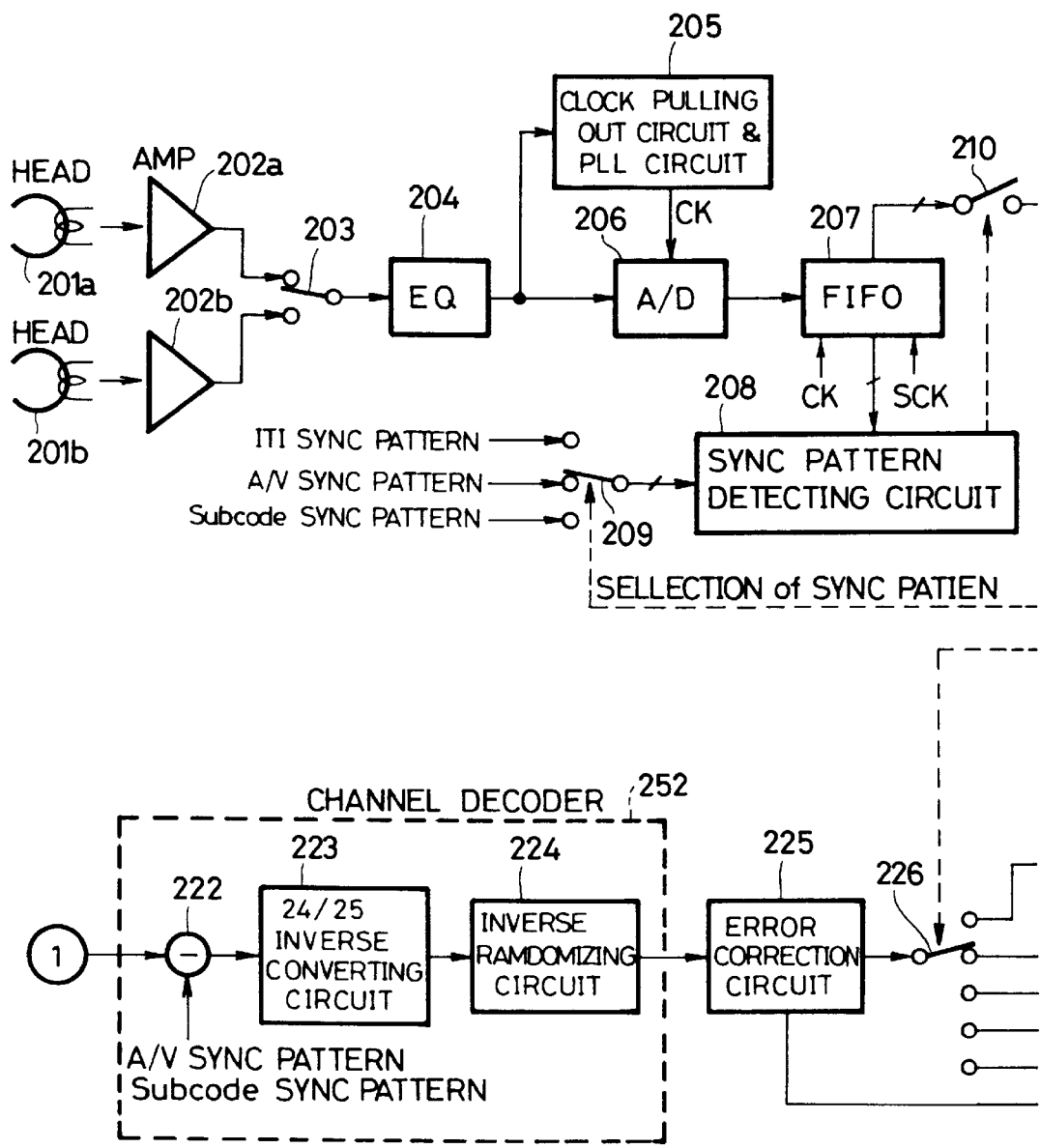

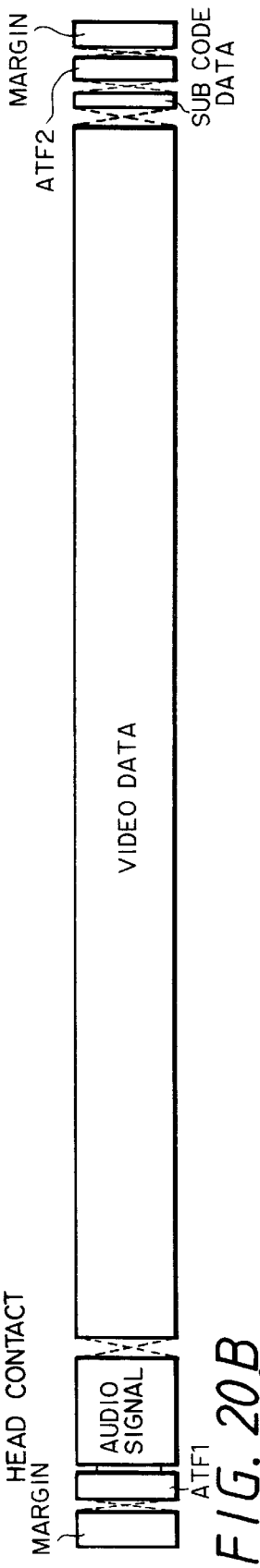
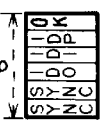
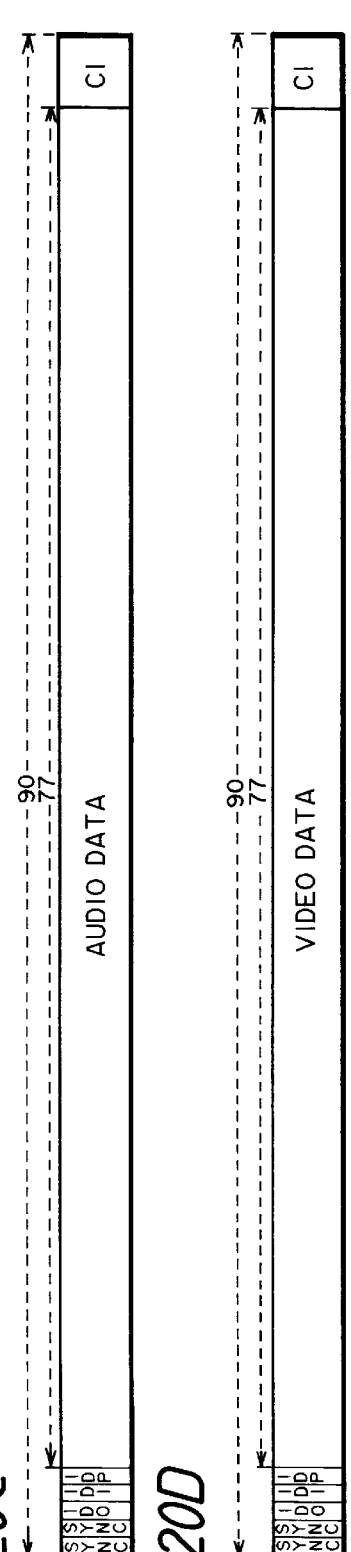
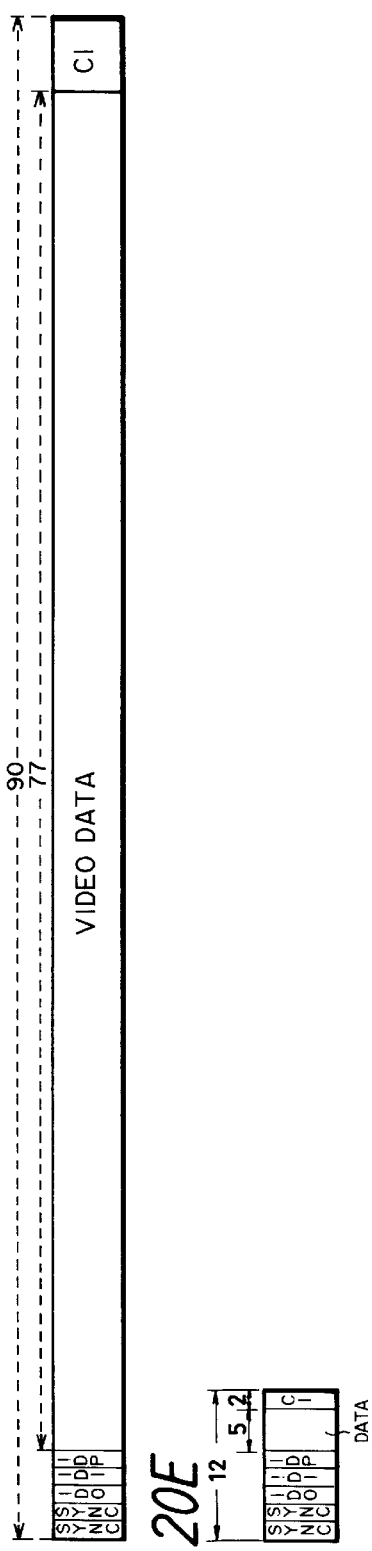
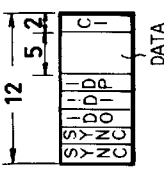

VIDEO TAPE RECORDING APPARATUS

BACKGROUND OF THE INVENTION

The present invention relates to video tape recording apparatus and methods providing control of recording commencement at the tape top.

Each of FIGS. 1 and 2 illustrates a respectively different mechanical tape deck in which an 8-mm tape cassette 100 has been mounted and from which a magnetic tape 102 has been drawn from a cassette shell 104 and wrapped around a rotary drum 106 thereof. As shown in FIGS. 1 and 2, an infrared generating unit 62 produces infrared light which is projected toward an infrared sensing unit 61 across the tape 102. The magnetic tape 102 includes a transparent leader portion at the beginning thereof followed by a real (recordable) magnetic tape portion. Since the leader portion is transparent, light from the unit 62 passes therethrough to the sensing unit 61, but is interrupted by the real tape portion when it intervenes between units 61 and 62.

In each of FIGS. 1 and 2, a border position 63 representing the position at which the leader portion joins the real tape portion of the magnetic tape 102, is detected by the infrared sensing unit 61 and the infrared generating unit 62. It will be seen that the distance along the tape 102 from the position 63 to a portion thereof wrapped around the drum 106, referred to as run-in portion 64 differs in the case of the tape decks shown in FIGS. 1 and 2.

The 8-mm VTR has a system controller which commences recording upon detection of the border position 63 by means of the units 61 and 62. Since the distance between the tape run-in portion and the border position 63 in the case of the mechanical deck of FIG. 1 is longer than that produced by the mechanical deck of FIG. 2, the recording area of the magnetic tape 102 in the case of the mechanical deck of FIG. 1 begins at a point further from the border position 63 than in the case of the mechanical deck of FIG. 2. This result is illustrated by FIGS. 3A and 3B which show, respectively, a recording area 67 of the tape 102 recorded by the mechanical deck of FIG. 1 and a recording area 67' of the tape 102 as recorded by the mechanical deck of FIG. 2.

As will be seen from FIGS. 3A and 3B, when a tape which has been recorded by the mechanical deck of FIG. 2 is reproduced by the mechanical deck of FIG. 1, portion 66 of the recording area 67' in FIG. 3B will not be reproduced. In addition, when a tape which has been recorded by the mechanical deck of FIG. 2 is later re-recorded by the mechanical deck of FIG. 1, and the re-recorded tape is thereafter reproduced by the mechanical deck of FIG. 2, the signals recorded in the area 66 cannot be reproduced.

These problems are common among 8-mm VTR's of various types, as well as VHS-system VTR's, Beta system VTR's and the like. The principal cause of these problems is that the various mechanical decks use different loading systems. Further loading systems of still other VTR's are illustrated in FIGS. 4A, 4B and 4C, by way of example.

OBJECTS AND SUMMARY OF THE PRESENT INVENTION

It is an object of the present invention to provide apparatus which alleviate the foregoing problems encountered in existing VTR's.

It is another object of the present invention to provide apparatus which permit reliable reproduction of signals recorded on magnetic tape near the tape top even though recorded by a VTR having a different loading system.

It is a further object of the present invention to provide apparatus which enable erasing of signals recorded near the tape top of a magnetic tape reliably even though recorded previously by a VTR having a different loading system.

In accordance with a first aspect of the present invention, a video tape recorder for recording and reproducing audio and video signals in tracks on a magnetic tape is provided. The video tape recorder comprises: means for recording and reproducing absolute track addresses in each of at least some of a plurality of tracks on a magnetic tape, the absolute track address of said each of at least some of the plurality of tracks corresponding to a distance of said each of at least some of the plurality of tracks from a start position of the magnetic tape, the absolute track addresses being incremented or decremented according to a predetermined rule with increasing track position along a recording direction of the magnetic tape; the recording and reproducing means being operative to record audio and video signals in the plurality of tracks; and control means for controlling the recording and reproducing means to initiate recording of the audio and video signals from a track having a predetermined absolute track address corresponding to a predetermined distance from the start position of the magnetic tape.

In accordance with another aspect of the present invention, a magnetic recording apparatus for recording signals on a magnetic tape is provided. The apparatus comprises: a rotary recording head for recording signals in successive tracks on a magnetic tape; tape transport means for transporting the magnetic tape past the rotary recording head in a recording direction; recording signal supply means for supplying reproduction control signals for recording by the rotary recording head for recording on said magnetic tape from a first position on the tape spaced from a start position thereof by a distance selected such that the tape transport means is able to establish a stable tape running state thereat, to a second position spaced from the first position in the recording direction, the distance in the recording direction along the tape from the first position to the second position being selected such that a tape transport of each of a plurality of predetermined magnetic tape reproducing apparatus is enabled to establish a stable running state based on the reproduction control signals when said tape transport has transported the magnetic tape from the first position to the second position thereof, the recording signal supply means being operative to supply information signals to the rotary recording head for recording in tracks along the magnetic tape following the second position thereof in the recording direction.

In accordance with a further aspect of the present invention, a magnetic recording and reproducing apparatus for recording and reproducing information signals on a magnetic tape is provided, comprising: a rotary head for recording and reproducing signals in successive tracks on a magnetic tape; tape transport means for transporting the magnetic tape past the rotary head in a recording direction; recording signal supply means for supplying reproduction control signals for recording by the rotary recording head for recording on said magnetic tape from a first position on the tape spaced from a start position thereof by a distance selected such that the tape transport means is able to establish a stable tape running state thereat, to a second position spaced from the first position in the recording direction; and reproducing means for reproducing the reproduction control signals with the use of the rotary head for stabilizing running of the tape by the tape transport means; the distance in the recording direction along the tape from the first position to the second position being selected such that the tape transport means is enabled to establish a stable running state based on the reproduction control signals when the tape transport means has transported the magnetic tape from the first position to the second position thereof; the recording signal supply means being operative to supply information signals to the rotary head for recording in tracks along the magnetic tape following the second position thereof in the recording direction.

The above, and other objects, features and advantages of the invention, will be apparent in the following detailed description of certain advantageous embodiments thereof which is to be read in connection with the accompanying drawings forming a part hereof, and wherein corresponding elements are identified by the same reference numerals in the several views of the drawings.

BRIEF DESCRIPTION OF THE DRAWINGS

FIGS. 5A through 5F are schematic diagrams for use in describing a recording format for one frame of digital data;

FIG. 11 is a schematic diagram of a subcode sector recorded in a subcode area of the recording format of FIGS. 5A through 5F;

FIG. 17 is a schematic diagram of a pack data structure common to all data packs of the embodiment of FIGS. 5 through 17;

FIGS. 20A through 20E are schematic diagrams for use in illustrating another tape track format for use in the present invention;

DETAILED DESCRIPTION OF CERTAIN ADVANTAGEOUS EMBODIMENTS

Figure 1:
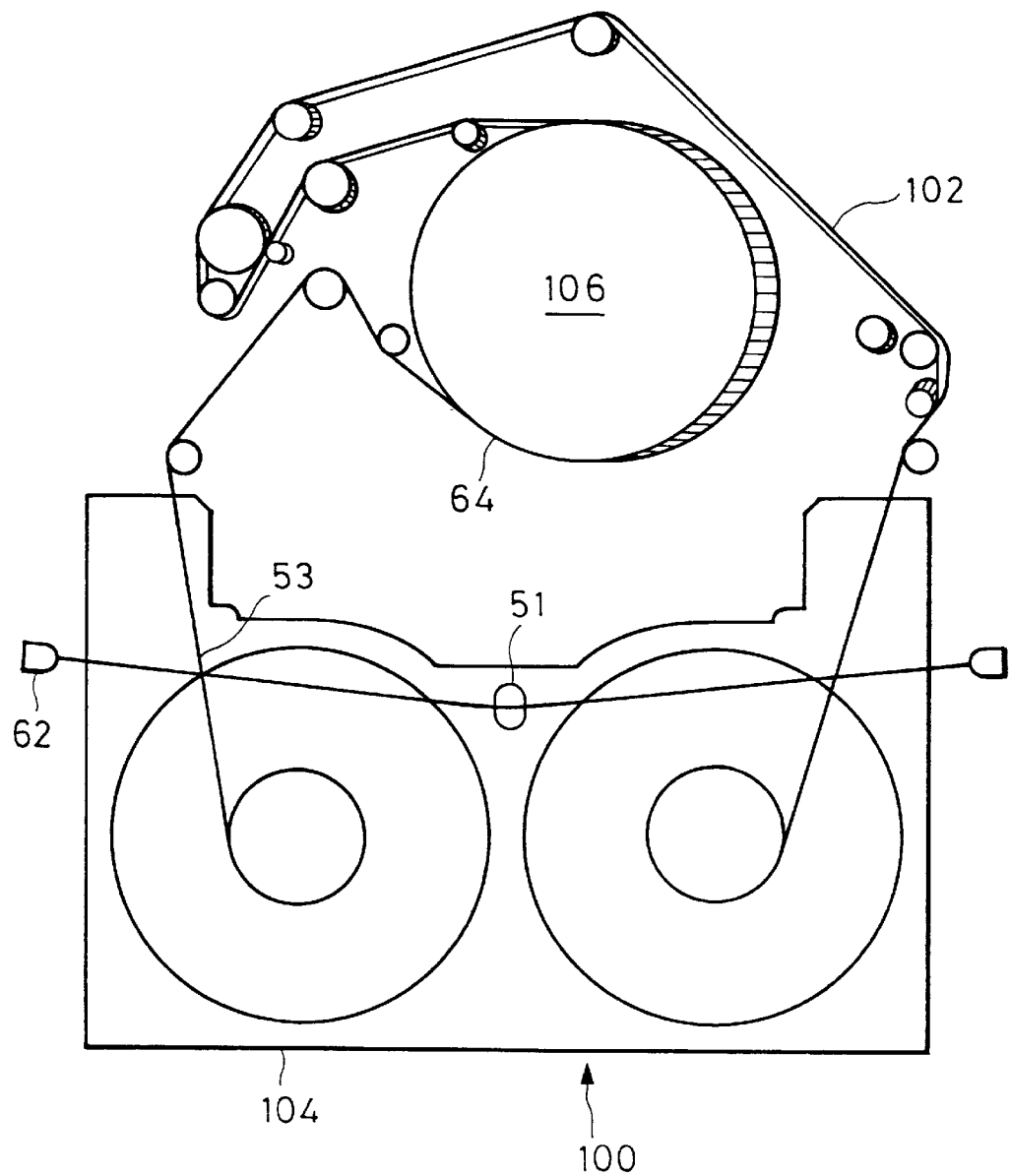
FIG. 1 illustrates a first type of conventional magnetic tape deck.
Figure 2:
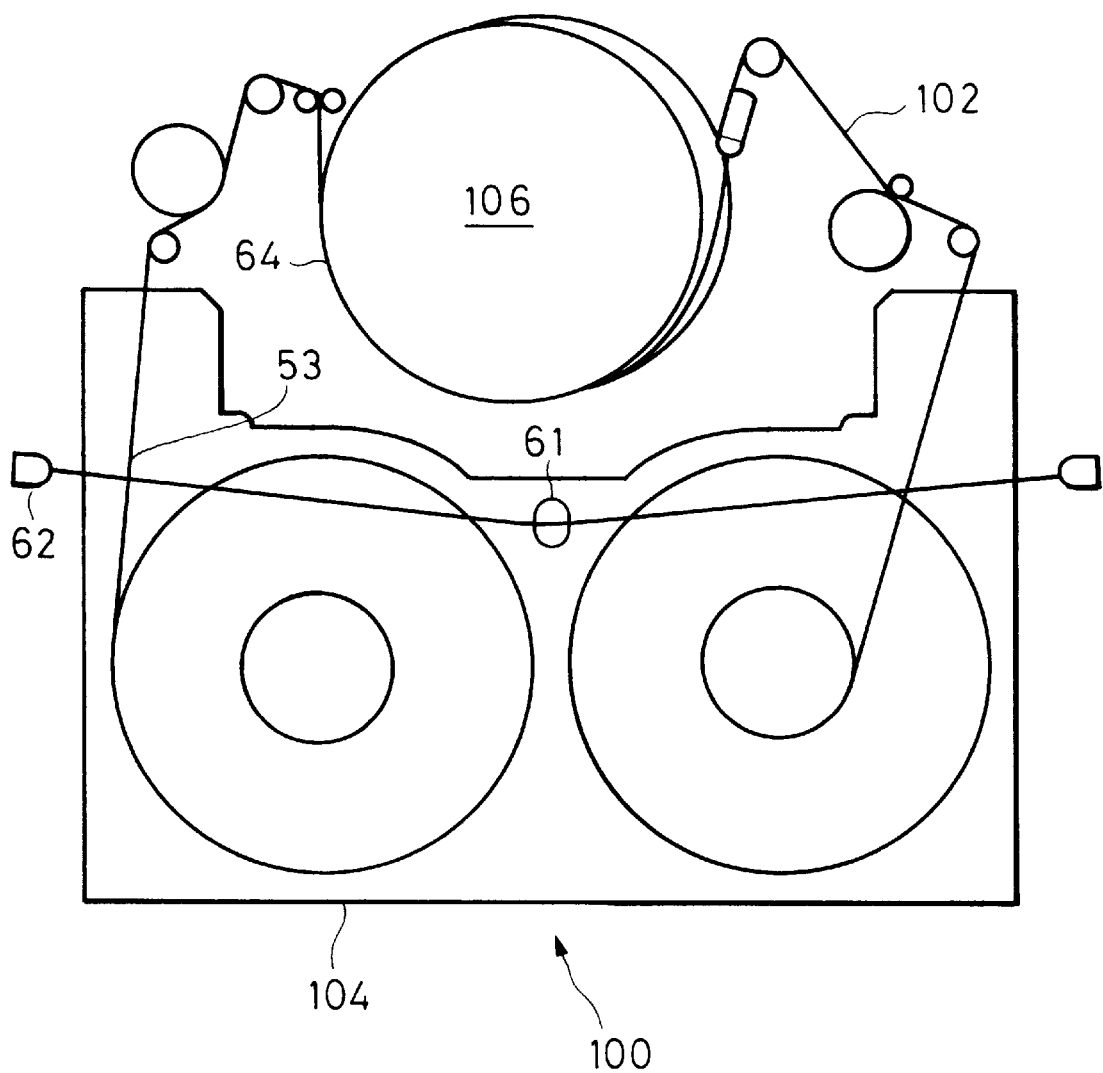
FIG. 2 illustrates a second type of conventional magnetic tape deck.
Figures 3A, 3B:
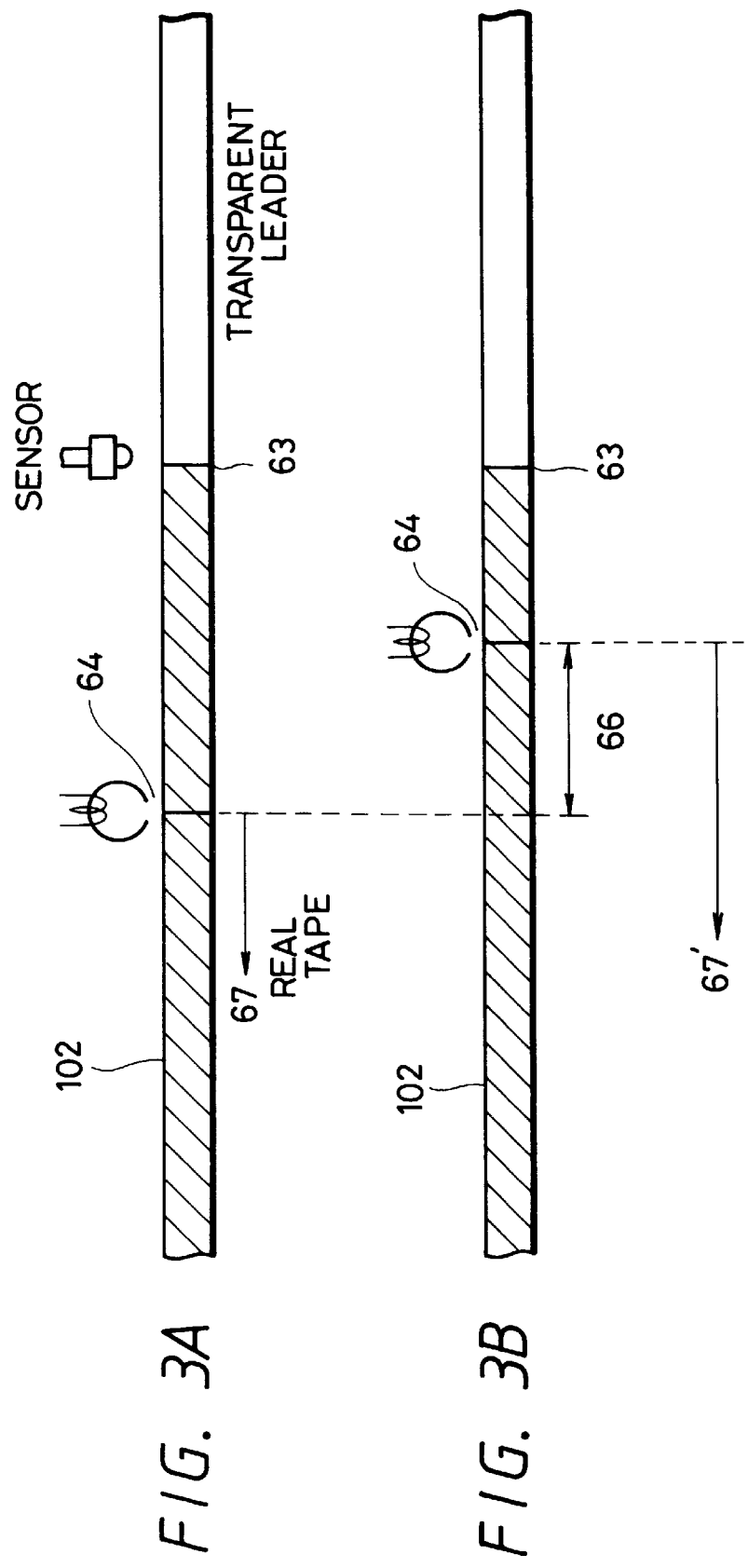
FIGS. 3A and 3B are schematic diagrams for illustrating the respective operations of the mechanical tape decks of FIGS. 1 and 2.
Figure 4A:
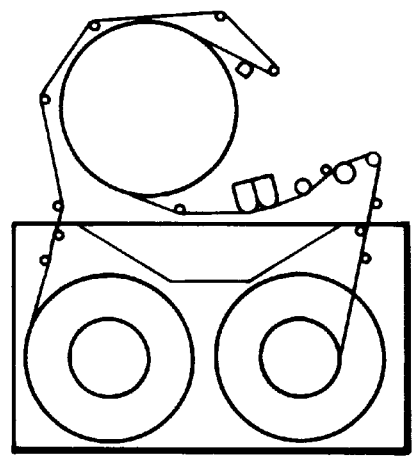
FIGS. 4A, 4B and 4C illustrate still further types of mechanical tape decks each having a different respective loading system.
Figure 4B:
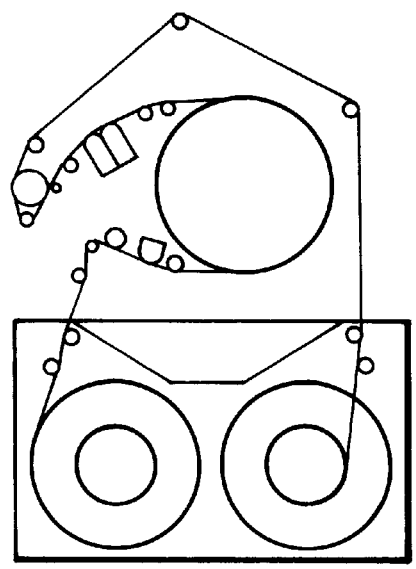
Figure 4C:
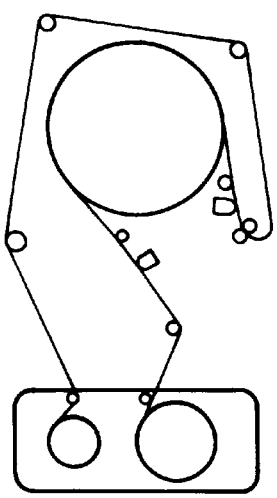
Figure 5E:
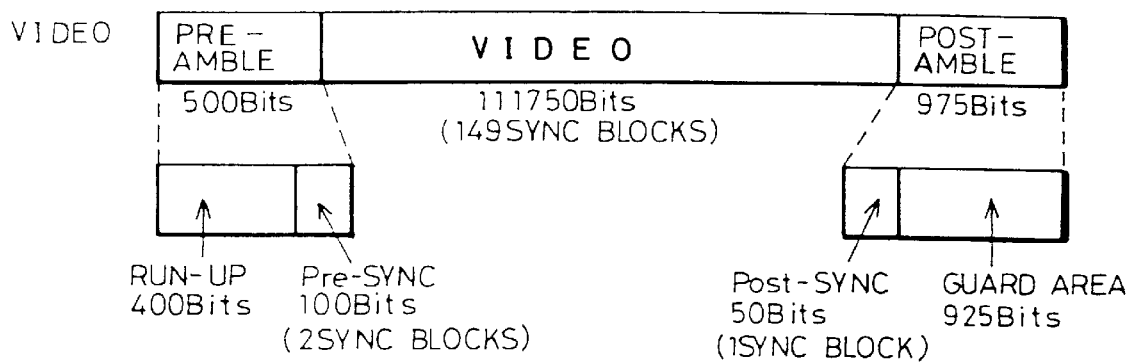

A recording format for an embodiment of the present invention is shown schematically in FIGS. 5A–5F. FIG. 5A illustrates a plurality of helically recorded tracks corresponding to one video picture frame. In the NTSC format, a frame is recorded in ten tracks and in the PAL format a frame is recorded in 12 tracks. Referring now to FIG. 5B, the recording format for one track is shown therein. The track is bounded by margins, and starting from the leftmost margin of FIG. 5B, which represents the recording start end, are successively an Insert and Track Information (ITI) area, an audio area, a video area and a subcode area. Also present between each of these areas are inter-block gaps (IBG's) which serve as a margin for editing and for prevention of data overwriting.

Figure 6:
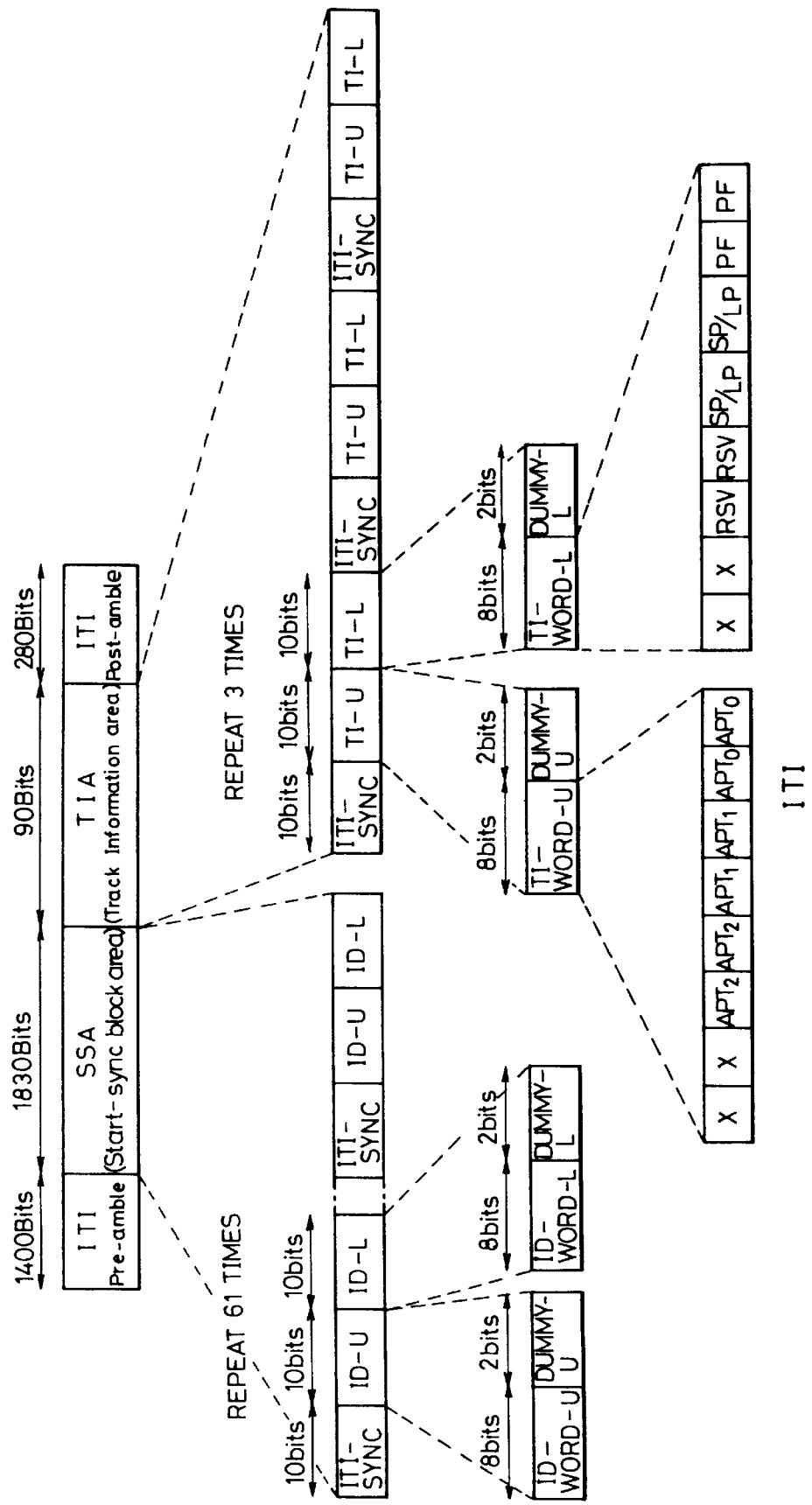
FIG. 6 is a schematic diagram of a format of an ITI area formed in each track of the recording format illustrated in FIGS. 5A through 5F.

The ITI area serves to store position information useful for proper head scanning of the track and functions in a manner similar to the ATF signal area of the 8-mm video tape format. Referring also to FIG. 6, the ITI area includes a pre-amble sector, a start-sync block (SSA) sector, a track information sector (TIA), and a post-amble sector. The TIA sector has a length of 90 bits and includes three blocks (ITI-SYNC, TI-U, TI-L) that are each recorded three times in succession. The TIU (track information upper) block includes main application identification data (APT) which defines the data structure of the remainder of the track. For the present embodiment, the value of APT is 000 which indicates that the areas following the ITI area are an audio area, a video area, and a subcode area. Other alternative data structures for the track are possible and would be represented by a different value for APT.

The TI-L (TI-word-lower) block includes SP/LP data and pilot frame (PF) data. The SP/LP data provides information indicating whether the track has been recorded for standard play, SP/LP=0, or for long play, SP/LP=1.

Figure 7:
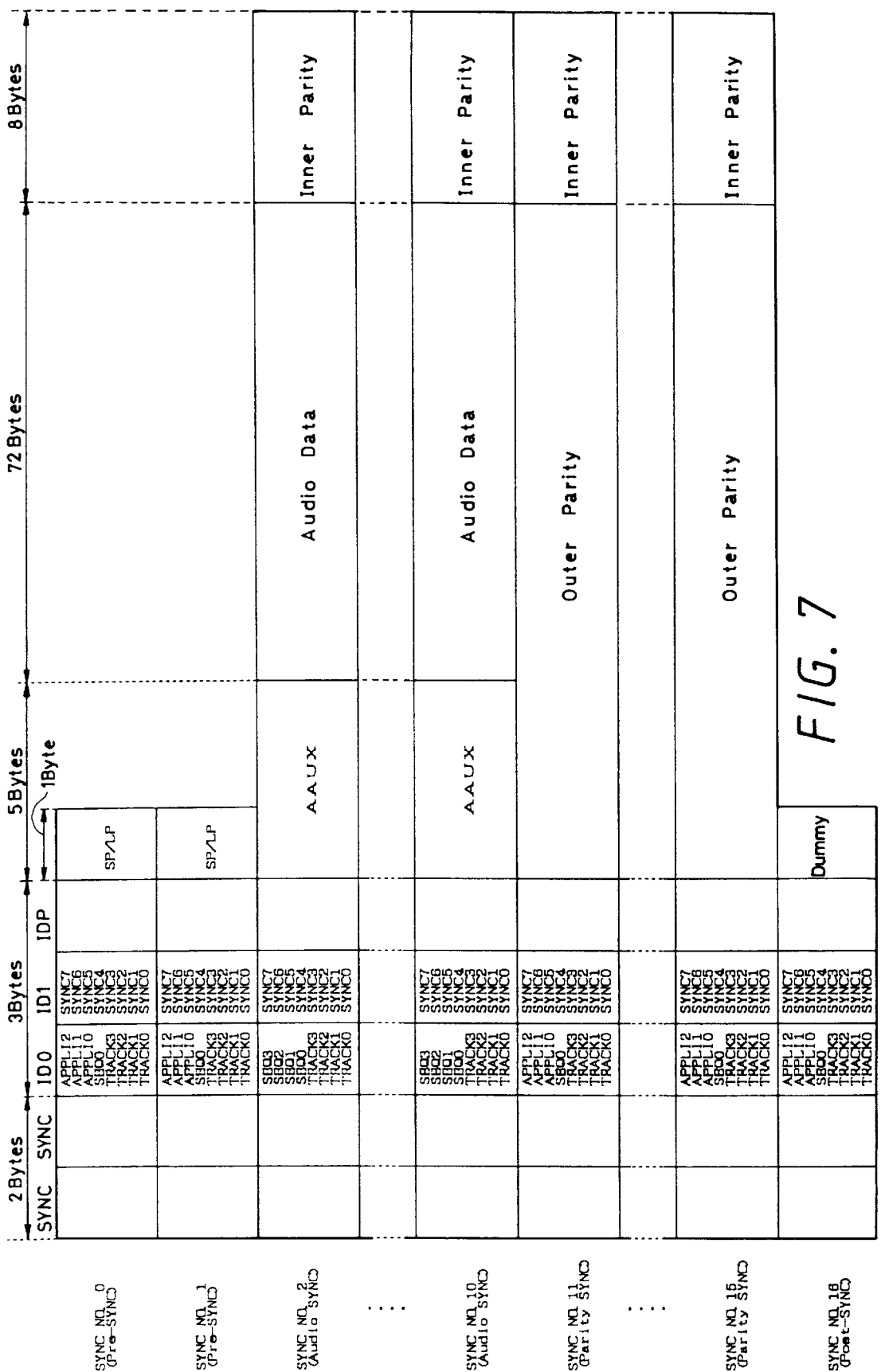
FIG. 7 is a schematic diagram of a recording format of an audio sector within an audio area of each track having the recording format of FIGS. 5A through 5F.
Figure 8:
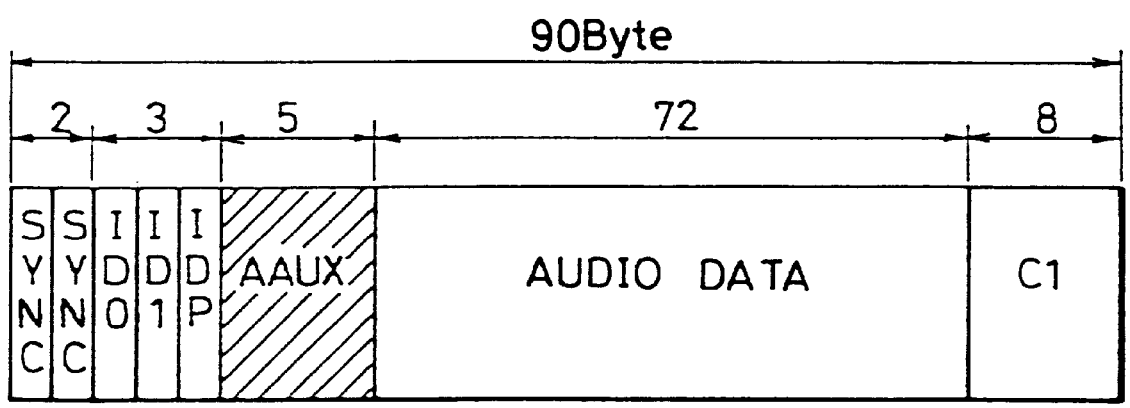
FIG. 8 is a schematic diagram of a sync block of the audio sector of FIG. 7.

As shown in FIG. 5D, the audio area is comprised of a pre-amble sector, which includes a run-up block and a pre-sync block, an audio sector and a post-amble sector, which includes post-sync and guard area blocks. Referring now to FIG. 7, the audio sector of the audio area is divided into 17 sync blocks, numbered 0–16. Each of the sync blocks include a 2 byte sync region and a 3 byte ID region. The ID region is divided into an ID0 byte, an ID1 byte and an IDP byte. The ID0 byte stores application data bits APPLI indicating the data format of the sync blocks, sequencing data bits SEQ for identifying the frame number during a variable speed playback mode and track data bits TRACK for identifying the track number within the frame, while the ID1 byte stores sync data, and the IDP byte stores parity data. Sync blocks 0 and 1 are pre-sync blocks and include an additional byte of SP-LP data. Sync blocks 2–10 are audio sync blocks and include 5 bytes of auxiliary information (AAUX), 72 bytes of audio data, and 8 bytes of inner parity data. FIG. 8 illustrates one of audio sync blocks 2–10. Sync blocks 11 to 15 are parity sync blocks and include 80 bytes of outer parity data and 8 bytes of inner parity data. Sync block number 16 is a post-sync block.

Figure 9:
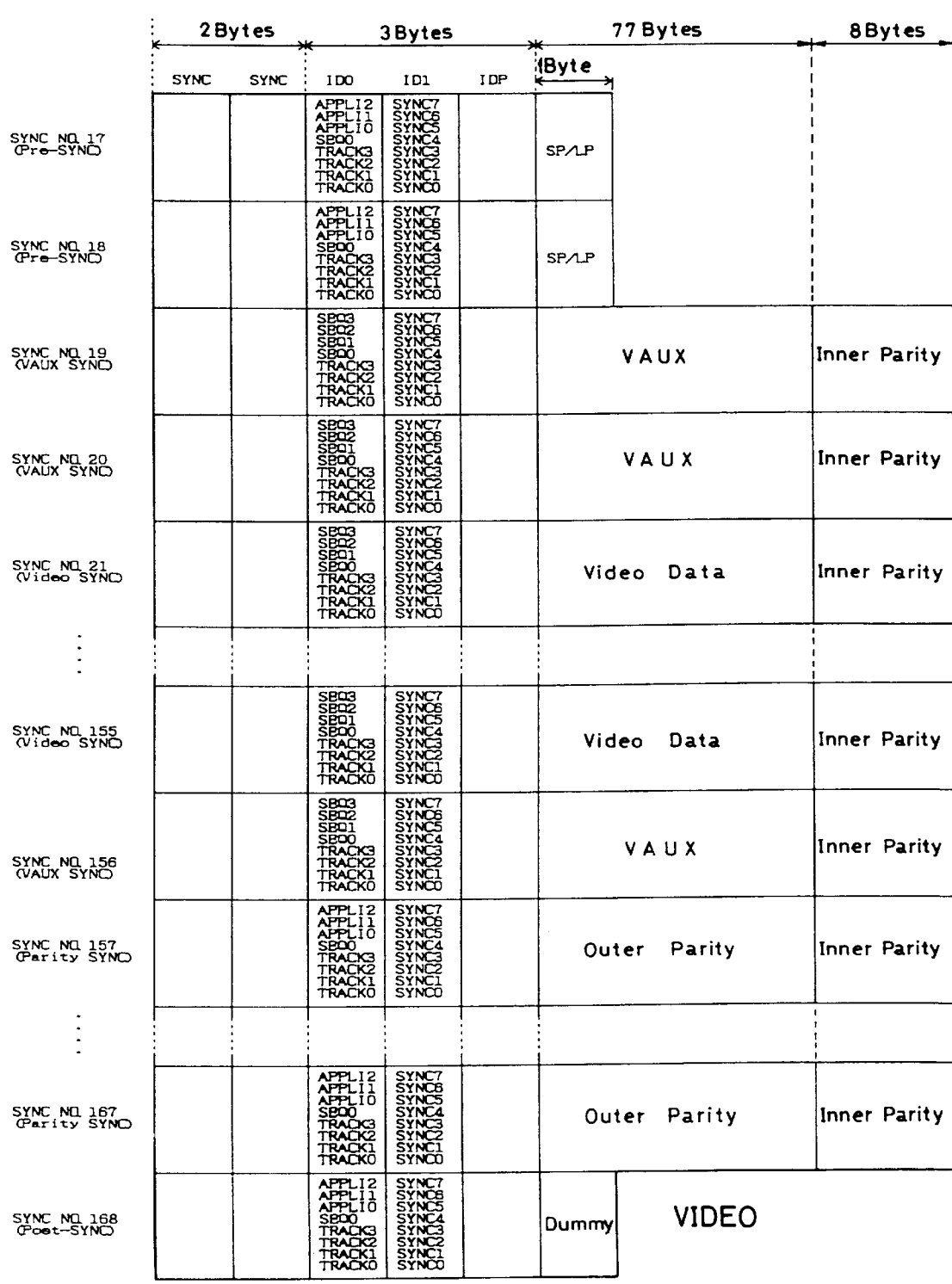
FIG. 9 is a schematic diagram of a video sector recorded in a video area of the recording format of FIGS. 5A through 5F.

Referring to FIG. 5E, the video area is shown therein and includes a pre-amble sector, which includes run-up and pre-sync regions, a video sector, and a post-amble sector, which includes post-sync and guard area regions. Referring also to FIG. 9, the video sector of the video area is shown therein and includes 151 sync blocks. As in the audio sector, each sync block includes 2 bytes of sync data and 3 bytes of ID data. Pre-sync blocks 17 and 18 and post-sync block 168 are structured similarly to the pre- and post-sync blocks of the audio sector. Sync blocks numbers 19, 20 and 156 are VAUX sync blocks—referred to as alpha, beta and gamma, respectively—and store accompanying information as described below. Sync blocks numbers 21 to 155 are video sync blocks and include video data as well as inner parity data. Sync blocks numbers 157–167 are parity sync blocks and include both outer parity data and inner parity data.

Figure 10A:
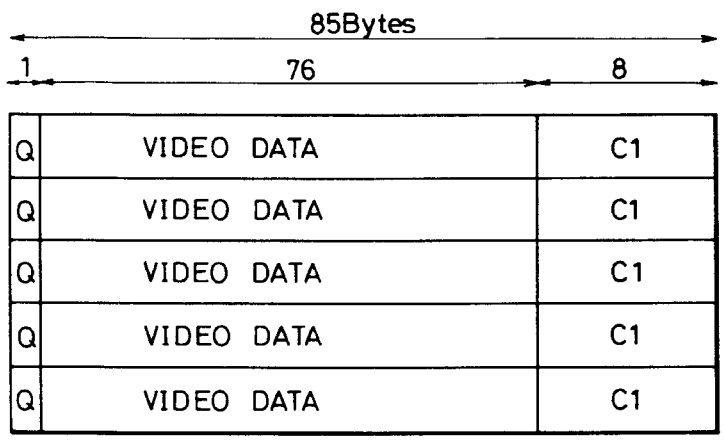
FIGS. 10A and 10B are schematic diagrams illustrating details of a plurality of video sync blocks of the video sector of FIG. 9.
Figure 10B:
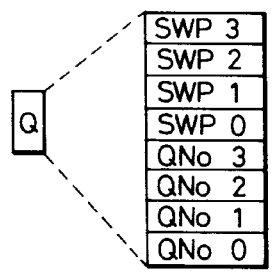

FIGS. 10A and 10B further illustrate a buffering unit formed of five sync blocks, each comprised of 77 bytes of video data and 8 bytes of inner parity data. The first byte is a Q data byte in which quantization data is stored. The 8 bits of the Q data byte are shown in further detail in FIG. 10B. The lower 4 bits of Q data, QNo0 to QNo3, represent quantization table numbers. The upper 4 bits SWP0 to SWP3 represent change-over points (switching points) of the quantization table numbers. A given quantization table number is used by one buffering unit and is repeated five times in the five sync block buffering unit, thus reducing the possibility of an error. The switching point data has a value associated with each sync block. Furthermore, the value [1111] is assigned to both the upper 4 bits and the lower 4 bits to represent an error code and the value [1110] represents an overflow code. Following the Q byte of each sync block are 76 bytes of video data.

Figure 5F:
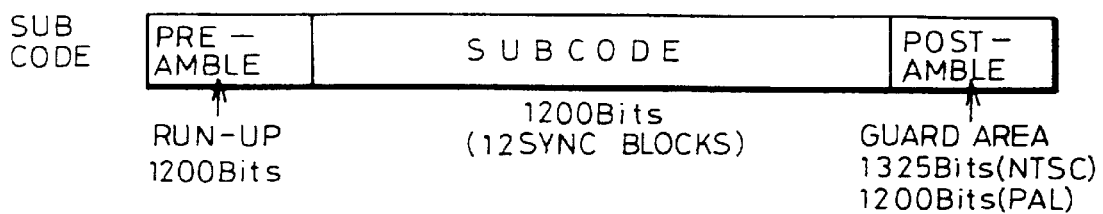

As shown in FIG. 5F, the subcode area includes a pre-amble sector, a subcode sector, and a post-amble sector. Referring now to FIG. 11, the format of the subcode sector is shown in detail therein and includes 12 sync blocks, 0–11. Each sync block includes 2 bytes of sync data, 3 bytes of ID data, 5 bytes of subcode data, and 2 bytes of parity data. Divided among the ID0 and ID1 bytes of a trio of such sync blocks is the absolute track number which consists of 23 bytes and provides a track identification or address which can be used during high speed searching of a tape. The absolute track number of each track corresponds uniquely to the position of its track on the tape and is incremented or decremented with each succeeding track on the tape according to a predetermined rule. In this embodiment the absolute track number represents the position of the track with respect to the start position of the real tape portion and is decremented or incremented by 1 with each successive track. This absolute track identification is repeated four times in the subcode sector.

Figure 12:
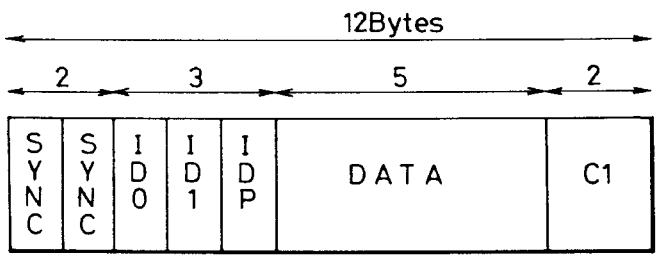
FIG. 12 is a schematic diagram illustrating details of a sync block of the subcode sector of FIG. 11.

Application data bits AP3 are stored in the ID0 byte of sync blocks 0, 6 and 11. Also present in the ID0 byte of all sync blocks is frame identification bit FR indicating whether the track is part of a first half of a video frame (FR=1) or part of a second half of a video frame (FR−0). Also present in the ID1 byte of sync blocks 0, 3, 6 and 9 is a blank flag (BF) which is used to indicate whether or not a recording discontinuity exists somewhere before the current absolute track number (i.e. whether blank tape portion precedes this track at any position along the tape) therefore indicating that the amount of tape remaining cannot be accurately determined from the absolute track address. FIG. 12 schematically shows one subcode sync block.

According to the present embodiment, valid ID0 and ID1 bytes of the audio, video and subcode sectors never take the value [11111111] and therefore, when an error appears in an ID0 or ID1 byte of a sync block and that error cannot be removed completely by error correction techniques, the values of the ID0 or ID1 byte for that sync block are replaced with [11111111], thereby providing readily detectable error data.

Figures 13A, 13B:
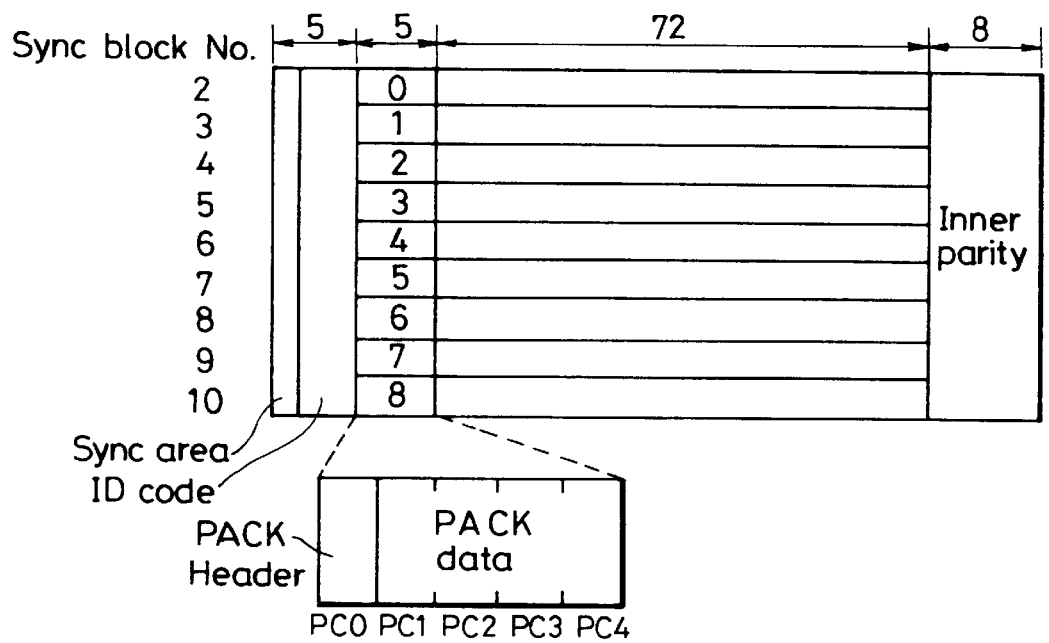
FIGS. 13A and 13B are schematic diagrams of a pack data structure within AAUX regions of the audio sector of FIG. 7.

Turning now to FIGS. 13A and 13B, the AAUX region of the audio data sector within the audio area is shown in further detail. As shown in FIG. 13A, the 5 bytes which constitute the AAUX region of each sync block form a "pack". The first byte thereof, PC0, serves as a pack header and the remaining bytes, PC1–PC4, serve as pack data.

FIG. 13B shows the audio pack data structure of one frame. In a frame consisting of 10 tracks, there is a total of 90 AAUX regions, 9 per track. Of the 9 AAUX regions in each track, 6 are considered main AAUX regions and the remaining are optional regions. As shown in FIG. 13B, the numbered regions are the main regions and include pack header data, which will be defined subsequently.

Figure 14:
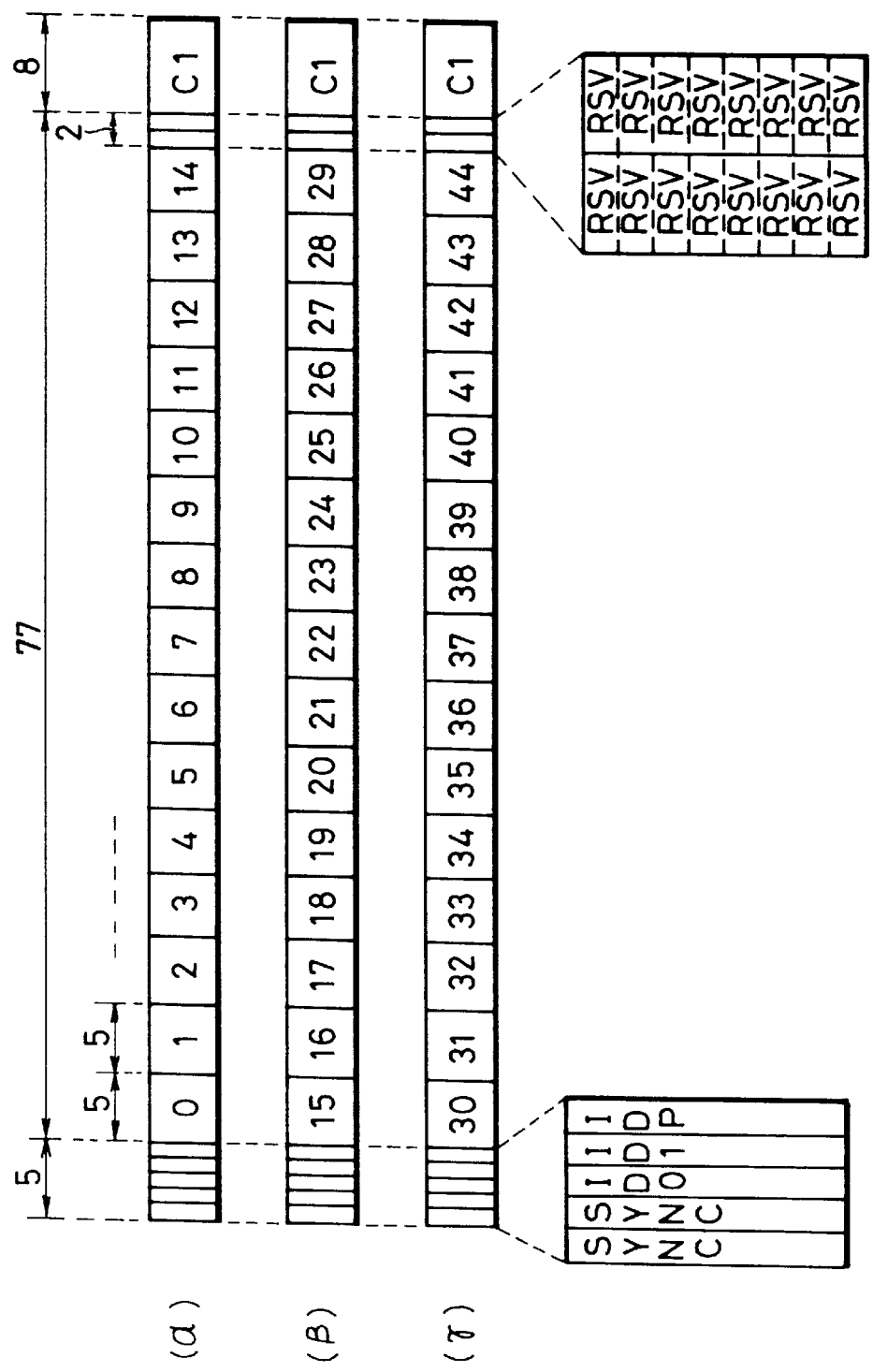
FIG. 14 is a schematic diagram illustrating the data structure of a VAUX region of the video sector of FIG. 9.
Figure 15:
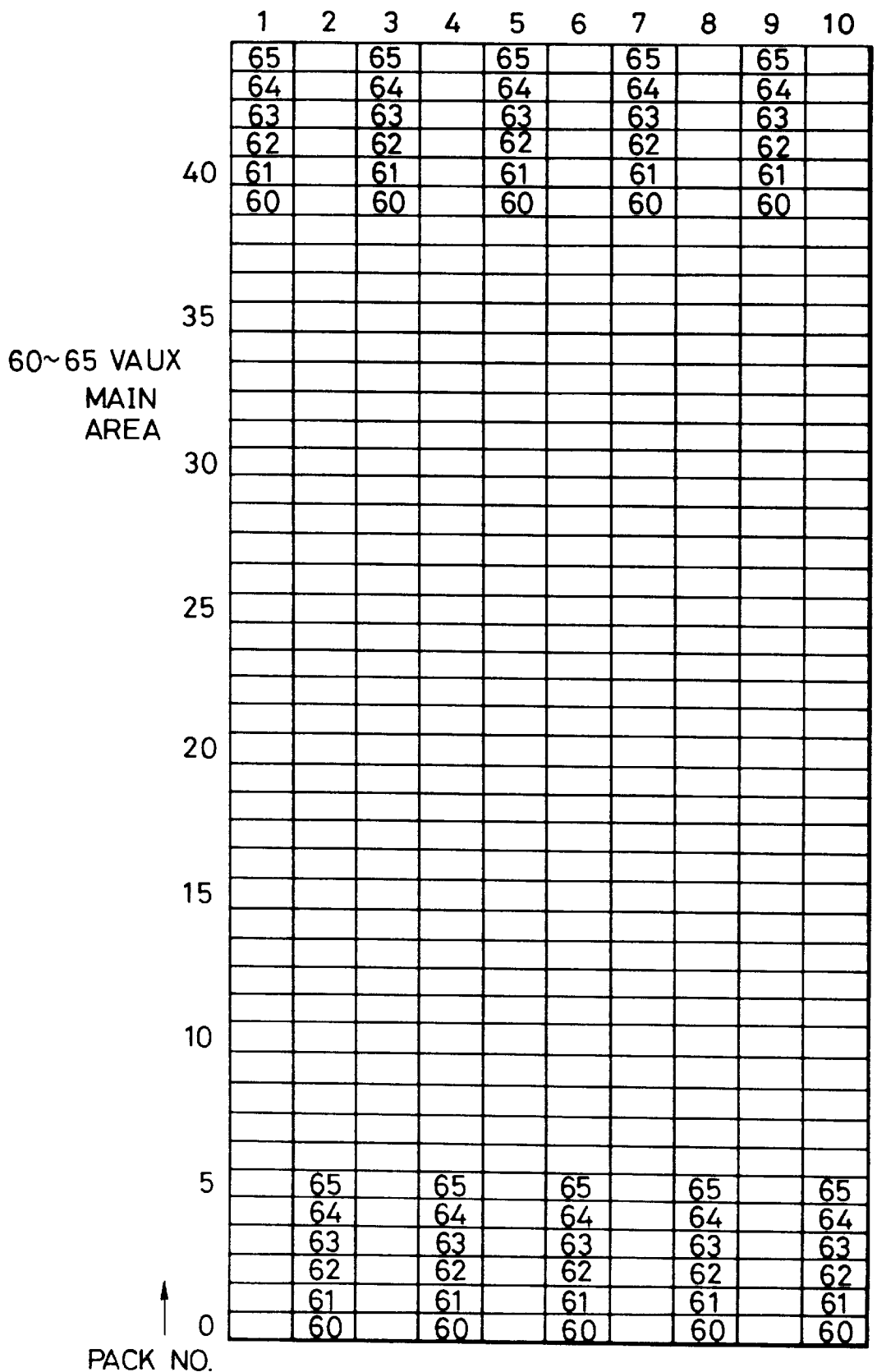
FIG. 15 is a chart of main data regions and optional data regions of the VAUX region of the each video sector.

Referring now to FIG. 14, the 3 VAUX sync blocks of the video sector of the video area are shown. Each VAUX sync block includes 15 5-byte packs, for a total of 45 packs per track. FIG. 15 shows the VAUX regions for all ten tracks of one NTSC frame. As described above regarding the AAUX regions, the VAUX regions are also divided into main regions and optional regions. The numbered regions of FIG. 15 are the main regions.

Figure 16A:
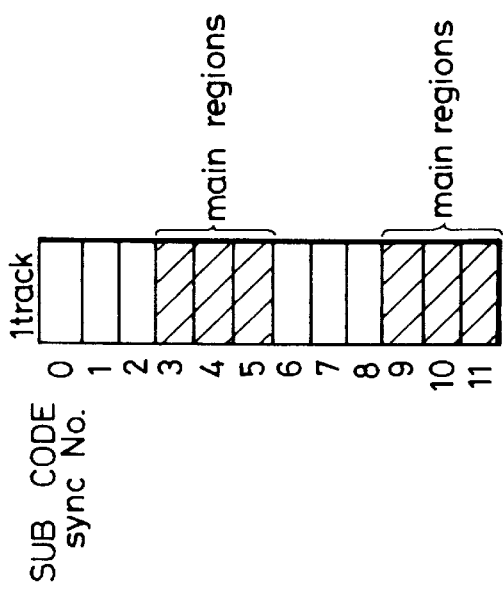
FIGS. 16A and 16B are schematic diagrams of first and second embodiments of main data regions and optional data regions of the subcode data regions of the subcode sector.
Figure 16B:
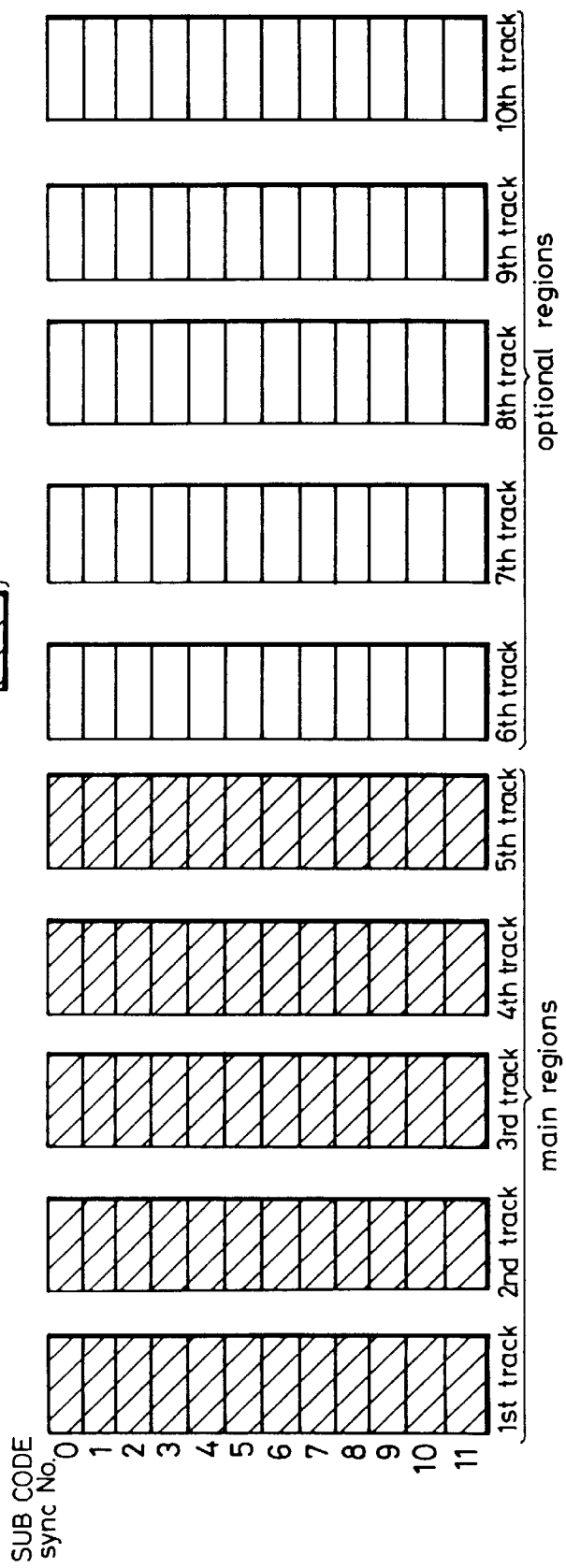

Turning now to FIGS. 16A and 16B, the subcode data region of each of the subcode sectors is comprised of a 5-byte pack. In one embodiment, the subcode data regions in sync blocks 3, 4, 5, 9, 10, and 11 of every subcode sector in a frame are main regions while the subcode data regions of the remaining sync blocks in the frame are optional regions, as shown in FIG. 16A.

Alternatively, instead of identifying some of the subcode data regions of a sector as main regions and others as optional regions, the entire subcode sector is identified as either comprising main regions or comprising optional regions. As shown in FIG. 16B, in the NTSC format, all subcode data regions of all sync blocks in the first five tracks of a frame are main regions, whereas all subcode data regions of the remaining five tracks are optional regions.

In the main region of the AAUX, VAUX and subcode data, information regarding basic data common to all tapes is recorded. The respective packs forming the main region store information of predetermined data items.

In the AAUX region, the main regions store data regarding the recording signal source, the recording date, the recording time or the like.

In the main region of the VAUX region, CLOSED CAPTION information for handicapped viewers can be stored, in addition to data representing recording time or other data similar to that of the main region of the AAUX region.

In the main region of the subcode area, there can be stored a time code representing title, chapter starting point data, or a part number, as well as the recording date and recording time data, as described above.

The basic data recorded in the main regions of the AAUX and VAUX regions are repeatedly recorded such that, as shown in FIGS. 13B and 15, the data is stored in every track and alternates between the recording head trace starting side and the recording head trace ending side of a track. Also, in the main region within the subcode sector, the basic data are repeatedly recorded in the 4th to 6th sync blocks and in the 10th to 12th sync blocks. Therefore, data is not dropped out even if the tape is scratched.

Furthermore, since the basic data are recorded by both the odd-numbered track recording head and the even-numbered track recording head, data drop out due to head clogging is reduced.

In addition to the basic data recorded in the main regions, accompanying information can be written into the optional regions such as, for example, character broadcast signal data, television signal data normally provided within the vertical blanking period or within the effective scanning period, computer graphics data, and the like.

FIG. 17 shows the structures for different kinds of packs, as will now be described in detail. Each pack includes 5 bytes of data. The first byte (PC0), the header, is assigned to item data (ITEM) indicative of the content of the succeeding bytes. The format of the succeeding 4 bytes (PC1 to PC4) is determined based on the item data.

The item data is divided into upper 4-bit data and lower 4-bit data. The upper 4-bit data identifies what is referred to as a "large" item, and the lower 4-bit data identifies what is referred to as a "small" item. The upper 4-bit "large" item and the lower 4-bit "small" item define the format and content of the succeeding data. There are at most 16 "large" items, and for each "large" item, there are at most 16 "small" items.

Because the contents of the data packs can be determined by reading the pack header, the position at which the pack is recorded can be set arbitrarily. Furthermore, because the presence or absence of an error can be represented by the pack data, as will be described later, errors can be detected and avoided.

Figure 18B:
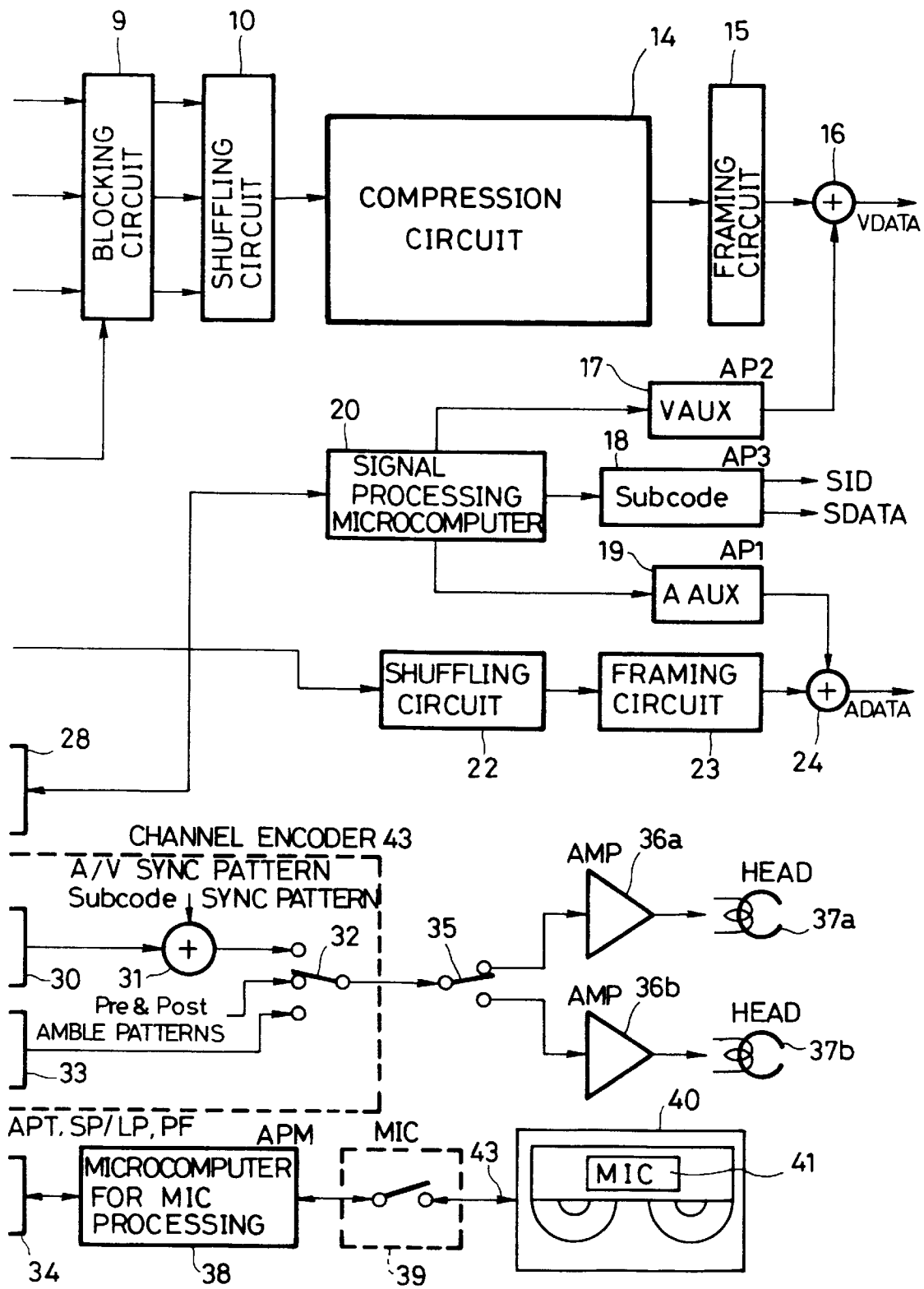
FIG. 18 is a block diagram of a recording system in accordance with an embodiment of the present invention.

Referring now to FIG. 18, an embodiment of a recording apparatus according to the present invention will be described. A magnetic tape cassette 40 comprises at least a magnetic tape and a MIC (Memory In Cassette) 41 for storing pack data as described above in communication with the recording apparatus.

The recording apparatus includes a communication terminal 43 and a communication controller (microcomputer for MIC processing 38) for writing the tape information and positional information in the MIC 41 based on the audio/video signals recorded on the tape.

A television signal received by antenna 1 is selected by a tuner 2 and restored to a composite video signal and a composite audio signal. Alternatively, a composite video signal is selected by a switch 3a from an external input 4. The selected composite video signal is applied to a Y/C separator 6 where it is divided into a luminance signal (Y) and color difference signals (R-Y, B-Y).

The composite video signal is also applied to a sync separator 11 from which a vertical synchronizing signal (VSYNC) and a horizontal synchronizing signal (HSYNC) are derived. These signals serve as reference signals for a PLL (Phase Locked Loop) circuit to generate a basic sampling signal of 13.5 MHz locked with the input signal. Since this frequency is not needed for a normal color signal in a normal condition, the 13.5 MHz frequency is divided by a factor of 2 or 4 by divider 13 and the resultant frequency is used for sampling the color difference signals. Sampling is performed at a ratio of 4:1:1 for the NTSC format and 4:2:0 for the PAL format.

The analog outputs from the Y/C separator 6 are band limited by low-pass filters (LPFs) 7a, 7b and 7c to avoid aliasing. The cutoff frequencies of these filters are, for example, 5.75 MHz for Y filter 7a; and 2.75 MHz for R-Y filter 7b and B-Y filter 7c. The filtered signals are then converted into digital signals by A/D converters 8a, 8b and 8c, and divided into code blocks of 8 samples by 8 lines each by a blocking circuit 9. The resultant code is shuffled by a shuffling circuit 10 to prevent data loss due to a clogged tape head or by a transverse scratch on the tape. Shuffling circuit 10 also rearranges the luminance data signal and the color difference data.

A data compression encoder 14 compresses the video data by discrete cosine transformation and requantization. The compressed video data is then packed by a framing circuit 15 into a predetermined sync block. Data of the video auxiliary data sector (VAUX), audio auxiliary data sector (AAUX), and subcode sector and a track number to be stored in the subcode area are generated by a signal processing microcomputer 20 and are fed to interface units 17, 18, 19, respectively. The interface unit 17 for the VAUX sector generates an AP2 (application ID), which is combined with the framing output by a combining circuit 16. The interface unit 18 for the subcode area generates data SID and AP3 and also generates pack data SDATA.

An audio signal is selected by switch 3b either from the output of tuner 2 or from an external analog audio input signal. The selected audio signal is converted by A/D converter 21 into a digital signal. The digital signal is then shuffled by shuffling circuit 22 and packed by framing circuit 23 into audio sync blocks. AAUX interface unit 19 supplies the AP1 data and the AAUX data packs to combining circuit 24 for combining with the audio sync block data.

A data generator 25 generates ID or AV (audio/video) signals, a pre-sync signal and a post-sync signal, one of which, together with the ADATA, VDATA, SID and SDATA, is selected by a time-division multiplexer 26 and added to parity data produced by an error correction code generator 27. The resultant signal is sent to a channel encoder 42. In the channel encoder 42, randomizing circuit 29 randomizes the signal supplied thereto to minimize its DC component. The resultant signal is coded by a 24/25 converting circuit 30 to provide a digital automatic track finding signal for servo control. Circuit 30 preferably is a Partial Response Class IV Circuit suitable for digital processing. The signal thus obtained is combined with an audio/video sync pattern and a subcode sync pattern by combining circuit 31. An ITI sector generator 33 is fed with APT (Application) ID data, SP/LP data, and PF data from a mode processing microcomputer 34. The ITI sector generator 33 packs this data into predetermined positions and applies resultant data to switch 32 which selects between this resultant data, pre- and post-amble data and the output of combining circuit 31 in a timed pattern. A switch 42 is used to select an LP or an SP recording mode and the setting of switch 42 is sent to microcomputers 34 and 38.

A final recording signal obtained from channel encoder 43 is selected by a switch 35 for supply alternately to diametrically opposed heads 37a and 37b after amplification by head amplifiers 36a and 36b for recording on tape 40.

Microcomputer for MIC processing 38 then generates pack data and APT data which is written in MIC 41 in the cassette 40 via an MIC switch 39.

Figures 2, 19A:
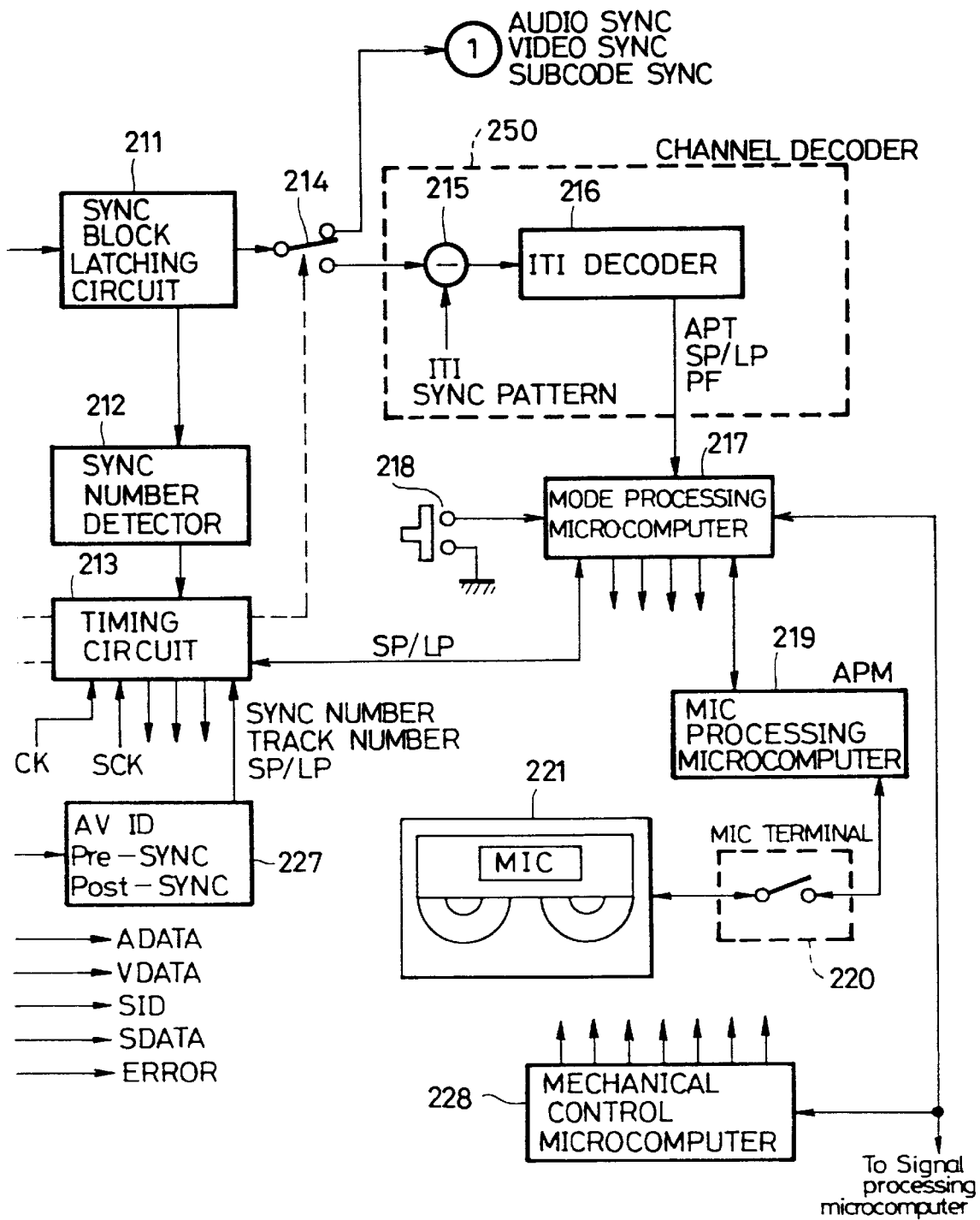
FIGS. 19A and 19B together provide a block diagram for illustrating a reproducing apparatus useful in practicing the present invention.
Figure 19B:
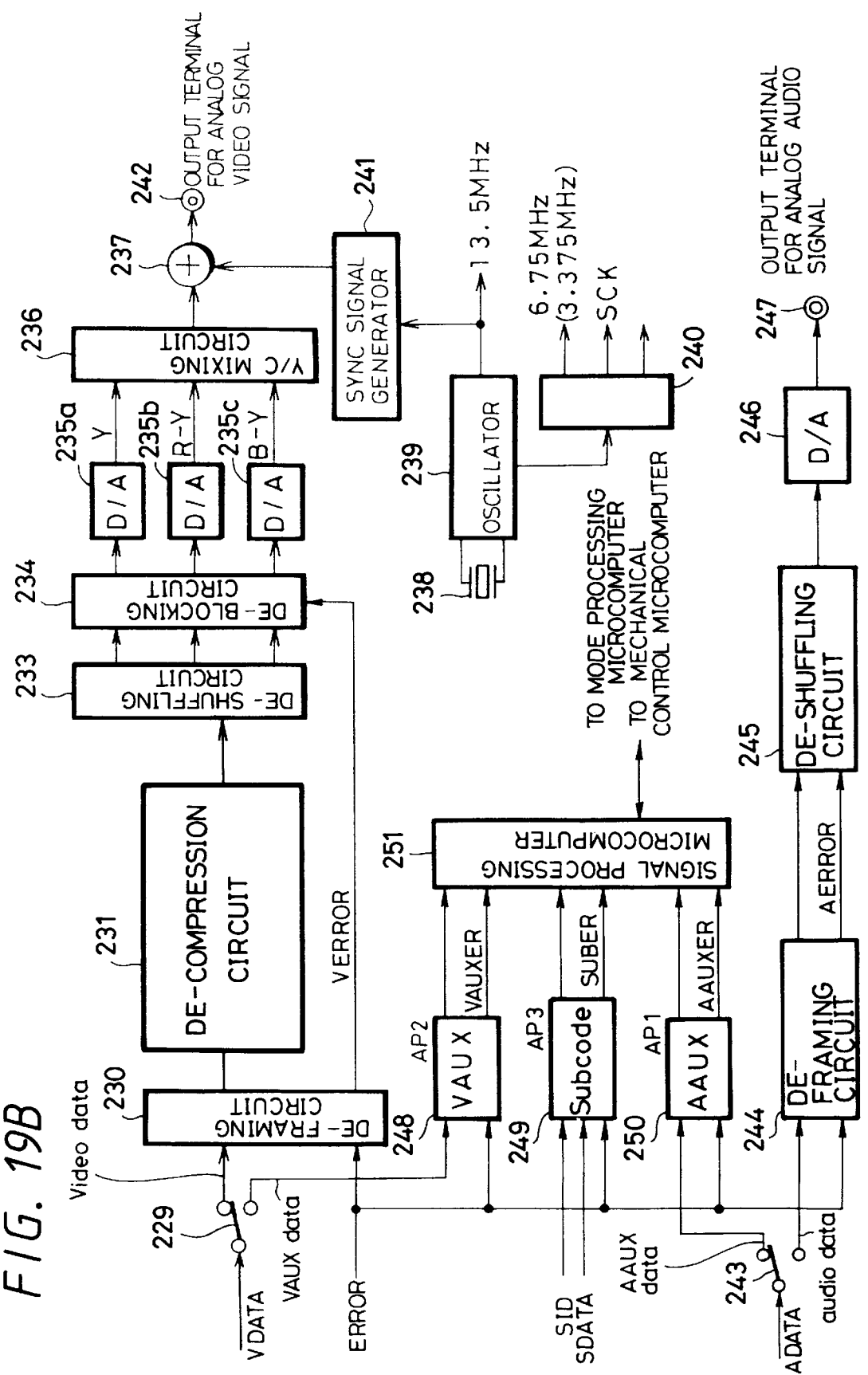

FIGS. 19A and 19B together provide a block diagram of a reproducing apparatus for reproducing data recorded by means of the recording apparatus of FIG. 18. Coded data in the format described above is read from a magnetic tape by heads 201a and 201b, the output of each of which is amplified by a respective amplifier 202a and 202b. Data from that one of the heads in contact with the tape is selected by a switch 203 and applied to an equalizing circuit 204. From the equalizing circuit, the data is provided both to the input of an analog-to-digital converter (A/D) 206 as well as to a clock extracting and phase locked loop (PLL) circuit 205 which serves to produce a clock signal from the reproduced data synchronized therewith for use in sampling the reproduced data by means of the A/D 206.

The digitized data is output by the A/D 206 to a time base corrector circuit including a first-in-first-out memory (FIFO) 207 which writes the data in accordance with the clock signal CK produced by the circuit 205 and outputs the data therefrom by means of a stable clock signal (SCK) produced by dividing the output of an oscillator 239 stabilized by a crystal 238 and by means of a dividing circuit 240 (refer to FIG. 19B).

A timing circuit 213 provided with the clock signal CK and the stable clock signal SCK outputs a signal to a selection switch 209 for selecting an appropriate one of an ITI sync pattern, an A/V sync pattern and a subcode sync pattern for provision to a sync pattern detecting circuit 208. The sync pattern detecting circuit is supplied with a parallel output from the FIFO 207 for detecting an appropriate sync pattern therein for closing a switch 210 in order to supply each successively reproduced sync block to a sync block latching circuit 211. The sync block latching circuit 211 outputs a signal to a sync number detector 212 for detecting a sync number for use by the timing circuit 213. The timing circuit 213 also controls the state of a selector switch 214 for appropriately supplying a reproduced ITI sync pattern to a first channel decoder 250 which serves to decode the reproduced ITI data, or to a second channel decoder 252 which serves to decode audio data (ADATA), video data (VDATA), SID and subcode data (SDATA).

The first channel decoder 250 includes a subtracting circuit 215 supplied at a first input with the reproduced ITI data and at a second input with the ITI sync pattern. The output of the subtracting circuit 215 is supplied to an ITI decoder which separates the APT data, the SP/LP data and the PF or pilot frame data. The pilot frame data is employed for effecting servo control based upon the reproduced signal. This data is supplied to a mode processing microcomputer 217 for effecting servo control by means of a mechanical control microcomputer 228, as well as for other purposes.

The reproduced audio, video and subcode data is supplied to the second channel decoder 252 and to a first input of a subtracting circuit 222 thereof which receives the A/V sync pattern or the subcode sync pattern, as appropriate, at a second input, and outputs the remaining data to a 24/25 inverse converting circuit 223 which serves to reconvert the data to its form as input to the circuit 30 of the channel encoder 43 of FIG. 18. The output of the circuit 223 is supplied to an inverse randomizing circuit 224 which serves to restore the data to its form as input to the randomizing circuit 29 of FIG. 18.

The output of the inverse randomizing circuit 224 is supplied to an error correction circuit 225 which outputs error corrected data to a demultiplexer 226, or else outputs an error signal indicating data which cannot be error corrected. From the demultiplexer 226 A/V ID data as well as pre-sync and post-sync are received by a circuit 227 for use by the timing circuit 213. The demultiplexer 226 also provides the audio data, video data, SID and subcode data at separate outputs which are processed further as described hereinbelow.

The apparatus as illustrated in FIG. 19A also includes a SP/LP selector switch 218 coupled with the mode processing computer 217. The mode processing microcomputer 217 also communicates with an MIC processing microcomputer 219 which reads information from and stores information in an MIC of a tape cassette 221 through an MIC terminal 220.

With reference also to FIG. 19B, the video data VDATA is supplied to a demultiplexer 229 which separates the video data therefrom for supply to a deframing circuit 230, as well as the VAUX data therefrom which is supplied to a VAUX circuit 248 for disassembling the various items thereof. The video data after deframing by the circuit 30 is subject to decompression by a decompression circuit 231 which carries out operations which are the inverse of those carried out by the compression circuit 14 of FIG. 18. The output of the decompression circuit 231 is deshuffled by a deshuffling circuit 233 and deblocked by a deblocking circuit 234 to separate digital Y, (R-Y) and (B-Y) data. The Y, (R-Y) and (B-Y) data are converted to analog form by a respective digital-to-analog converters 235a, 235b, and 235c and thereafter mixed by a Y/C mixing circuit 236 and combined with horizontal and vertical synchronizing signals generated by a sync signal generator 241 under control of the oscillator 239 to output a composite analog video signal at an output terminal 242.

The audio data ADATA is demultiplexed by a demultiplexer 243 to separate audio data therefrom which is supplied to a deframing circuit 244 as well as AAUX data therefrom which is supplied to an AAUX circuit 250 which serves to separate the various data items therein. The output of the deframing circuit 244 is supplied to a deshuffling circuit 245 which then outputs a deshuffled data stream which is then reconverted to analog form by a digital-to-analog converter 246. The analog data supplied thereby is output at a terminal 247.

The SID and subcode data (SDATA) are supplied to a subcode data separation circuit 249. The separated data items supplied by the circuits 248, 249 and 250 are supplied thereby to a signal processing microcomputer 251 for use in generating appropriate control signals for application to the mode processing microcomputer 217 and the mechanical control microcomputer 228 of FIG. 19A.

FIGS. 20A through 20E illustrate a further track format for a digital VTR in accordance with an embodiment of the present invention. FIG. 20A illustrates the track format overall wherein, from the head contact side, a margin area is followed by an ATF1 (automatic track finding signal) area, an audio signal area, a video signal area, a subcode data area, an ATF2 area and a further margin area. A preamble and a postamble are provided for each area and gaps are also provided for separating the areas to prevent data overwriting. Each ATF area includes a timing sync (synchronizing) block (hereinafter referred to as an FT) which is used for adjusting signal timing. Each ATF area also includes an ATF signal for effecting servo control.

FIGS. 20B through 20E illustrate the sync block structure within respective ones of the track areas. Each sync block includes a common 16-bit SYNC pattern. Following the common sync pattern, an ID portion is provided including two bytes labeled ID0 and ID1 followed by a single byte of ID parity for error protection. With reference to FIG. 20B, the FT portion of the ATF areas includes a total of six bytes including the foregoing sync and ID bytes as well as one byte of dummy data.

Referring to FIGS. 20C and 20D, the audio and video sync blocks include the foregoing SYNC and ID data followed by audio and video data, respectively, and C1 parity data. In addition, each of the audio and video signal areas includes a C2 vertical parity which, together with the C1 parities provides a product code structure. The C2 parity area is included in sync blocks following the audio and video data sync blocks illustrated in FIGS. 20C and 20D, respectively, and which are omitted for simplicity and clarity.

The subcode area includes 12 bytes, the above-mentioned SYNC and ID data followed by 5 bytes of data and 2 bytes as C1 parity. While the ID data of the FT portion of the ATF area, as well as those of the audio and video signal areas indicate the number of the respective track within the corresponding frame, the ID data of the subcode area contains the absolute track number. The ID data format for the subcode area is the same as that illustrated in FIG. 11 of the previously described track data format. Like the subcode area format of FIG. 11, the subcode area of FIG. 20E includes 12 sync blocks wherein sync blocks numbered 0 through 5 contain an ID data pattern which is repeated in sync blocks 6 through 11 thereof.

Figure 21A:
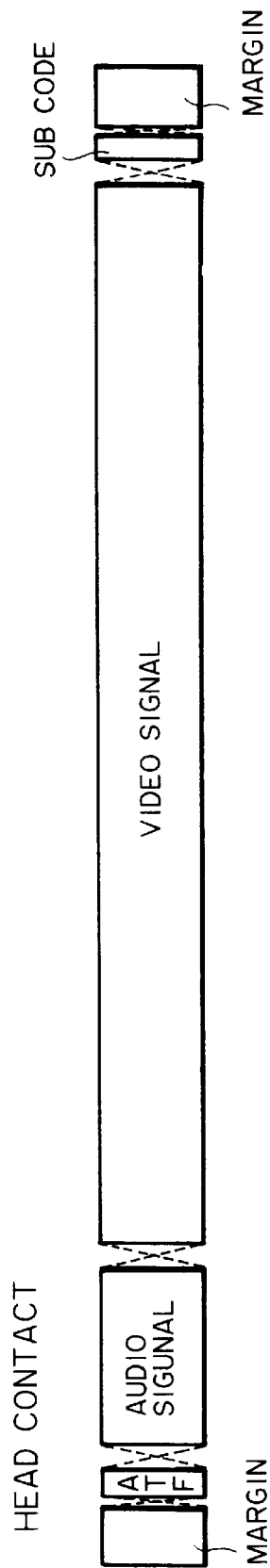
FIGS. 21A and 21B are schematic diagrams for use in illustrating a further tape track format useful in practicing the present invention.
Figure 21B:
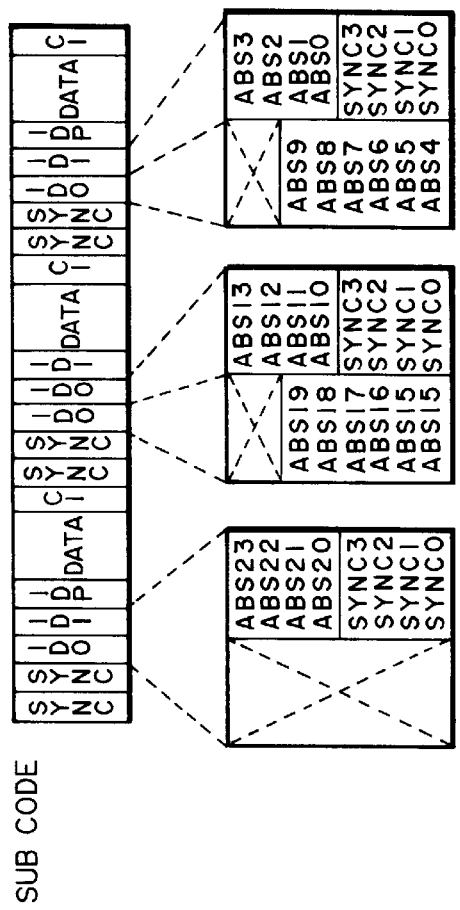

A further track data format is illustrated with reference to FIGS. 21A and 21B. With reference to FIG. 21A each track in this format includes, from the tracing start position, a margin area, an ATF area, an audio signal area, a video signal area, a subcode area and a margin area, in that order. As in the case of the format of FIGS. 20A through 20E, preambles and postambles are provided for each area as well as gaps for maintaining separation between areas. With reference to FIG. 21B, the data format of the subcode area of FIG. 21A is illustrated therein. As shown in FIG. 21B, a 24 byte absolute address for the respective track is contained in the ID0 and ID1 bytes of three successive subcode sync blocks and includes absolute address bytes ABS0 through ABS23. The subcode area includes 12 sync blocks overall so that the absolute address for the track is repeated four times in the subcode area. Accordingly, it is highly probable that the absolute address for the track number will be reproduced even during variable high speed playback and high speed search modes.

Figure 22:
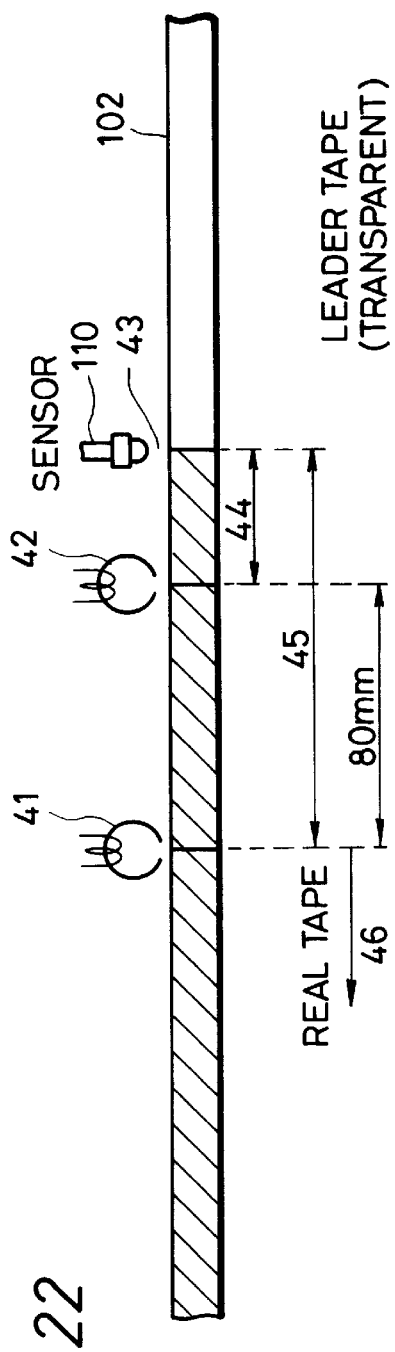
FIG. 22 is a schematic diagram for use in illustrating a basic concept underlying the present invention.

FIG. 22 is now used to illustrate a fundamental concept which underlies the present invention. In the schematic illustration of FIG. 22, the magnetic tape 102 includes a leader tape portion which is transparent, followed by a real magnetic tape portion which is joined to the leader tape portion at a border position 43. As noted above, an optical sensor is used to detect the border position 43, as illustrated by the sensor 110 in FIG. 22. A first magnetic head 42 illustrates a closest position with respect to the border position 43 at which a head of any of a plurality of VTR's having different respective mechanical decks, contacts the real tape portion upon detection of the border position 43. A second head 41 illustrates the furthest position on the real tape from the border position 43 at which the head of any of the plurality of VTR's contacts the tape upon detection of the border position 43.

From the foregoing, it will be seen that any of the plurality of VTR's as described above can reproduce data written in the area 46 as illustrated in FIG. 22. However, to ensure that any of the VTR's can reproduce all of the recorded data, the area 45 of FIG. 22 must not contain any such data. One way to carry this out is to disable recording by any of the plurality of VTR's through a distance equal to the distance 45 in FIG. 22 less the distance 44 thereof representing the distance from border position 43 to the point at which any of the plurality of VTR's can first record upon detection of the border position 43.

If it is assumed that the distance 45 less the distance 44 is 80 mm and that the track pitch is 9 $\mu$m, then this area corresponds to 8,889 tracks in length. Accordingly, in the present embodiment once the tape top is detected in the case of a blank tape, the tape is transported by a distance corresponding with 8,889 tracks without recording of data (such as video and audio signals) to be output by the VTR, after which such data (such as video and audio signals) is recorded beginning with track 8,890. However, preceding track 8,890, data such as ITI data and subcode data may be recorded, but data such as video and audio data is then maintained in a "don't care" state, such as "black" video data.

Figure 23B:
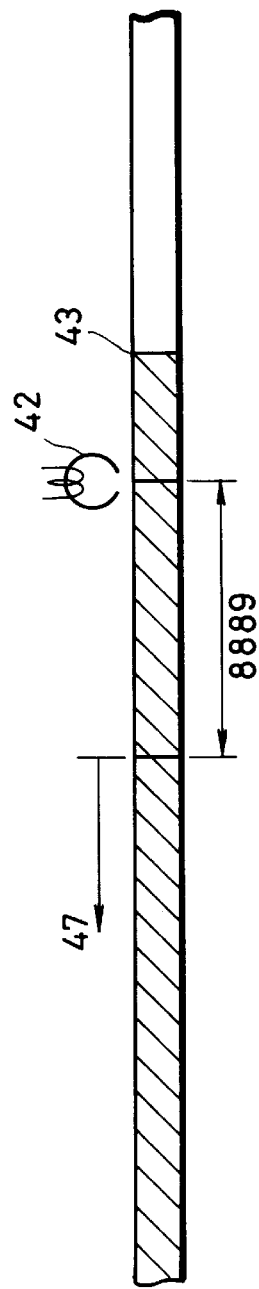
FIGS. 23A and 23B are schematic diagrams for use in explaining the operation of an alternative embodiment of the present invention.
Figure 23A:
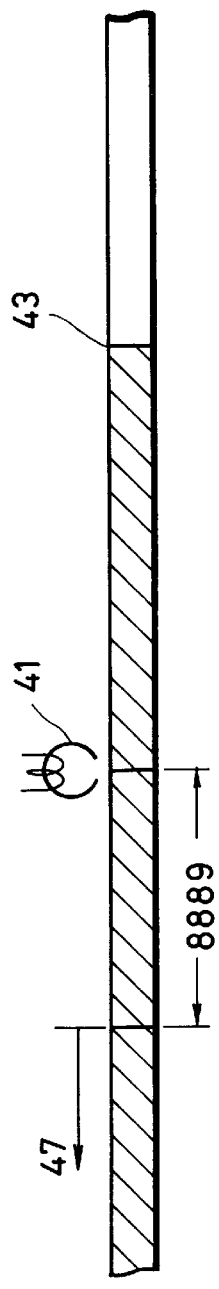

This operation is illustrated by FIGS. 23A and 23B. FIG. 23A schematically illustrates the operation of a VTR of the above-described plurality of VTR's in which the distance between the border position 43 and the first position along the real tape portion thereafter at which recording by a recording head 41 thereof can commence is a maximum value among the plurality of VTR's. FIG. 23B schematically illustrates the operation of a different VTR of the plurality of VTR's wherein a recording head 42 is positioned at a minimum distance from the border position 43 when it is detected by the respective VTR. In each case, once the border position 43 is detected, the tape is transported by an additional 8,889 tracks before recording of signals to be output by the respective VTR (such as audio and video signals) commences.

It will be appreciated that when a tape recorded by either of the VTR's is reproduced by the same device, reproduction will be carried out without any difficulty. In addition, when a tape has been recorded in the manner illustrated in FIG. 23B, subsequent reproduction by a VTR operating as shown in FIG. 23A will result in immediate detection of the track number 8,890 when the border position 43 is detected so that playback then commences.

However, a problem occurs where a tape has been recorded as shown in FIG. 23A and is subsequently reproduced by a VTR operating as shown in FIG. 23B. In this case, when the tape top or border position 43 is detected, the head 42 does not reproduce any signal so that it cannot then be determined whether the tape previously has been recorded or is a blank tape.

Figure 24:
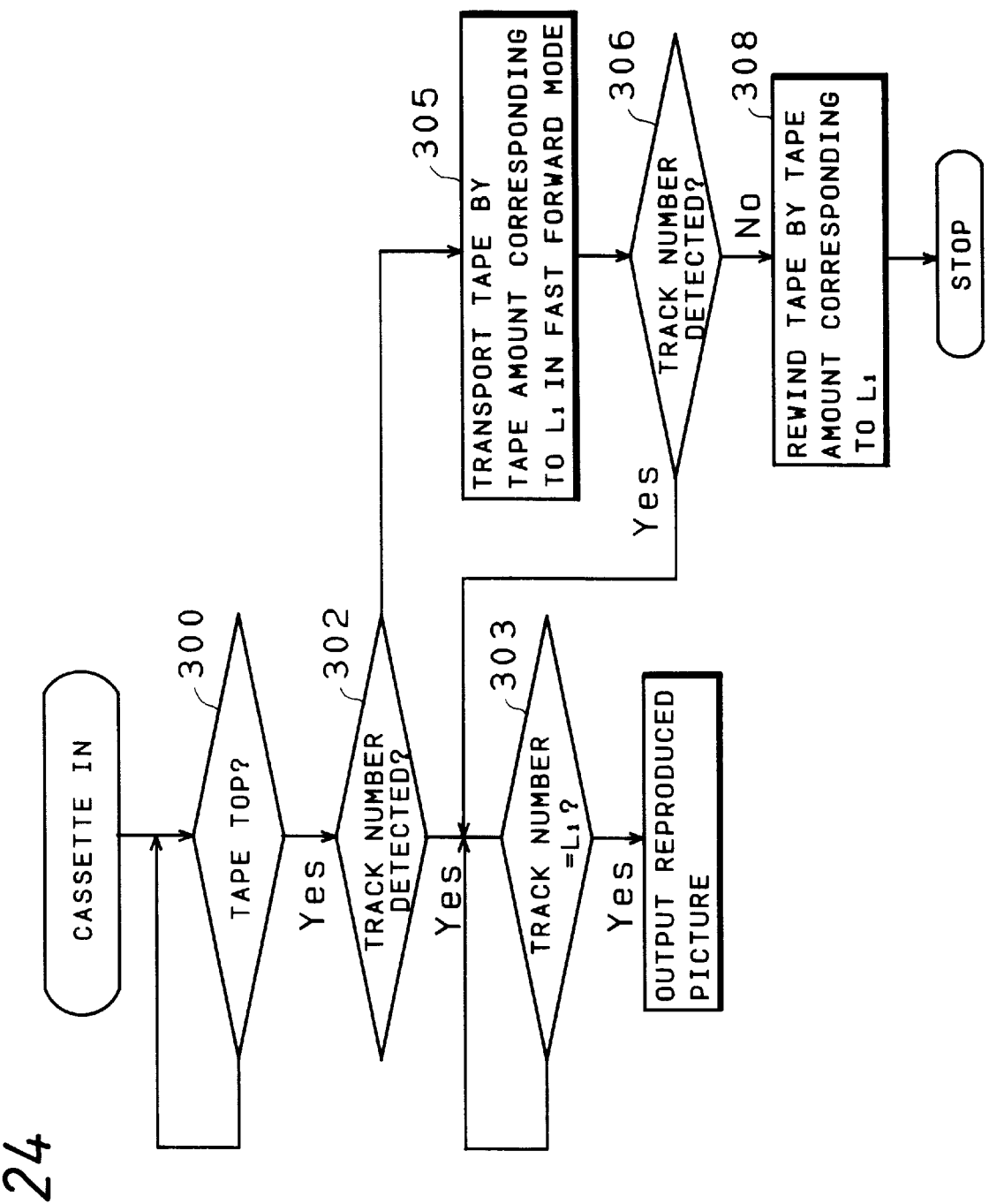
FIG. 24 is a flow chart for use in explaining the alternative embodiment.

To solve this problem, and with reference also to the flow chart of FIG. 24, the VTR according to this embodiment of the present invention initially searchers for the tape top or border position 43, as indicated by step 300. Once the tape top is detected, the VTR determines whether a track number is then detected, as indicated in step 302. If so, the VTR continues to transport the tape while determining whether the track number is equal to the predetermined number at which recording commences (L1) as indicated in step 303. Once the track number L1 is detected, the VTR begins to output the reproduced data, that is, picture and sound data.

However, if in step 302 a track number is not detected when the tape top has been detected, the VTR then transports the tape by an amount corresponding to the distance indicated by the track number L1 in a fast forward mode, as indicated by step 305 and determines in a step 306 whether a track number has been detected. If so, processing continues to step 303 so that data can be output once the reproduced track number is equal to L1. If, however, in step 306 a track number has not been detected, the VTR rewinds the tape by an amount corresponding to the track number L1, as indicated in step 308 and then stops, as it is assumed that the tape in the VTR is a blank tape.

It will be appreciated that the foregoing embodiment of the present invention provides the ability to reliably reproduce and erase signals at the tape top even where the loading system of the VTR which recorded the signals previously is different from that of the VTR in which recording or reproduction is subsequently carried out. Therefore, the disadvantages of conventional VTR's as described above can be overcome in accordance with the present invention.

As noted above, the blank portion of the tape following the tape top 43 varies depending upon the particular VTR, and in the case of the VTR whose operation is illustrated in FIG. 23A, the blank portion has a maximum length. To reduce the length of this blank area, the track number assigned to the first recorded track by each VTR is determined based on the characteristic of its mechanical deck in order to eliminate excess blank tape areas. For example, in the case of the VTR whose operation is illustrated in FIG. 23A, the first recorded track can be assigned a number such as 8,800 so that recording thereby commences shortly after detection of the tape top 43 thus to minimize the resulting length of blank tape.

Figure 25:
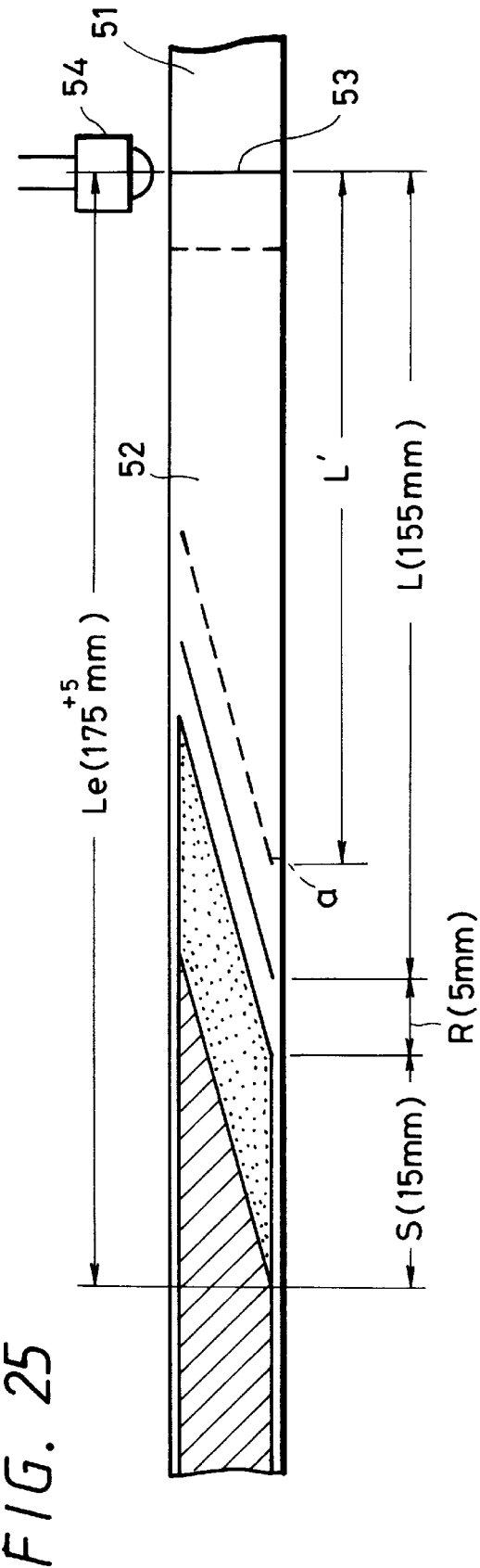
FIG. 25 is a schematic diagram of a recording pattern formed in accordance with a further alternative embodiment of the present invention.
Figure 26:
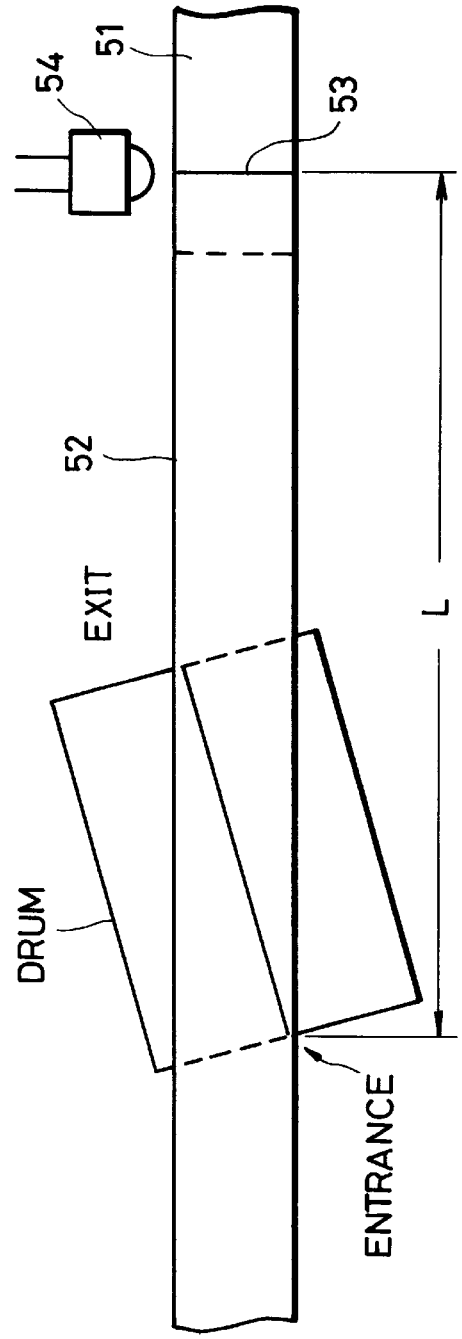
FIG. 26 is a schematic diagram for use in explaining the further alternative embodiment.

A further embodiment of the present invention will now be described in connection with FIGS. 25 and 26. With reference first to FIG. 25, a recording pattern formed by a VTR according to the present embodiment on a magnetic tape is illustrated therein. The magnetic tape includes a transparent leader portion 51 and a real tape portion 52 which is spliced to the leader portion 51 at a splicing area 53 which is also referred to as a tape top.

The VTR of the present embodiment provides an effective recording disabled distance L along the tape having a first predetermined length from the tape top 53, as detected by a tape top sensor 54 of the VTR after the tape has been loaded onto a mechanical deck of the VTR. The effective recording disabled length L is selected such that, when the tape is loaded onto a head drum of the VTR, the rotary heads thereof form a first track having an initial scanning position beginning at the distance L from the tape top 53, as illustrated in FIG. 26. The portion of the tape extending from the tape top 53 a distance L therefrom in the recording direction, therefore, cannot be recorded or reproduced by the mechanical deck of the VTR. Among a plurality of VTR's, the effective recording disabled distance L has a maximum value of 155 mm. To ensure the ability to reproduce and erase a tape which has been recorded by means of the VTR of the present embodiment by means of any of these VTR's, its effective recording disabled distance L is set at 155 mm.

Following the tape area extending the distance L from the tape top 53 is a recording servo actuating area R which is provided with a length sufficient so that the VTR's head drum and capstan may be set in a stable running state after recording is commenced at the end of the disabled recording area. In this embodiment, the recording servo actuating area R is set at 5 mm (corresponding to 0.27 seconds as the tape is transported in a normal recording mode) in view of the maximum length of the effective recording disabled distance L.

Following the recording servo actuating area R in the recording direction of the tape is an invalid data recording area S having a second predetermined length along the recording direction of the tape. The invalid data recording area S provides a reproducing servo actuating interval which is sufficient in length to permit a VTR to achieve stable operation in the playback mode based on a servo signal which is recorded by the VTR in the invalid data recording area S. In the area S, the video and audio signals either are muted or are recorded in a "don't care" state, for example, a black level video signal. In the present embodiment, the invalid data recording area S is provided with a length of 15 mm in the recording direction (corresponding to approximately 0.8 seconds as the tape is transported in the recording mode). An effective recording start position is spaced a distance Le from the tape top and at the end of the area S. The distance Le is selected so that any of a plurality of VTR's can record and reproduce valid data following the position which is the distance Le from the tape top. In the present embodiment, the effective recording start position is spaced a distance Le=175 mm from the tape top 53 at a minimum, but in actual practice is increased by 5 mm after consideration of possible errors in detecting the tape top.

When a previously unrecorded tape is recorded by means of the VTR of the present embodiment, the position of the tape top 53 is detected by the sensor 54 in a tape loading mode of the VTR. Assuming that the recording head is positioned at a point a on the tape as indicated in FIG. 25 at that time, the position a would be dependent on the particular loading apparatus of the VTR. Accordingly, when the tape recording mode is initiated (with the head originally positioned at point a), if it is assumed that the distance from point a to the tape top 53 is L', then the VTR transports the tape by a further distance (L−L') while the recording servo actuating area R then commences a distance L' from the tape top 53. In this case where the effective recording disabled distance L' is less than 155 mm, the invalid data recording area S is lengthened beyond 15 mm to ensure that the playback servo of any of the plurality of VTR's will be enabled to establish stable operation once the tape has been transported to the effective recording start position Le.

When a tape that has been recorded by means of the VTR of the present embodiment is later reproduced, the position of the tape top 53 is detected in the tape loading mode. Assuming that a represents the position of the head when the tape top 53 is detected and at which the head remains in the tape loading mode, upon commencement of the reproduction mode, the tape is advanced by the distance (L−L')+R so that the head advances from the position a to the starting point of the invalid data recording area S.

Thereupon, a reproducing servo of the VTR is actuated so that the drum and capstan thereof are set in a stable running state and so that effective data, such as video and audio data, can be reliably reproduced from and after the effective recording start position Le.

Video and audio signals recorded by means of the VTR of the present embodiment are erased in the following manner. Similarly to the above-described recording mode, invalid data including a servo signal is recorded in the invalid data recording area. Thereafter, previously recorded video and audio data are erased by overwriting new video and audio data in the effective recording area of the tape.

While in the present embodiment the effective recording disabled distance, the length of the recording servo actuating area and that of the invalid data recording area are defined in the manner described above, the absolute track number is recorded along the tape so that the above areas may also be defined by means of the track number as in the previously described embodiments.

By setting the effective recording disabled distance L to account for the maximum of corresponding distances among the plurality of different types of VTR's, setting the length of the recording servo actuating area R so that the drum and capstan are set in a stable running state, and providing an invalid data recording area S of sufficient length so that the reproducing servo achieves stable operation before effective data is reproduced regardless of which of the plurality of VTR's is employed for reproducing the same, effective data such as video and audio signals can be recorded, reproduced and erased reliably from the start thereof on the tape by any of the plurality of VTR's.

In addition, since the invalid data recording area S is provided, the reproducing servo may be set in a stable running condition as the invalid data recording area S passes by the position of the reproducing head. Consequently, the recorded video and audio signals can be reproduced from the start thereof by any of the plurality of VTR's in a reliable manner.

The present invention is not limited to 8-mm VTR's, but also finds application in a wide variety of apparatus in which video and audio signals are recorded and reproduced in digital form, such as VHS VTR's, BETA-type VTR's, etc.

As described above, in one embodiment of the present invention video and audio signals are recorded and reproduced from a position on a tape corresponding with a predetermined track number which is selected so that any of plurality of VTR's can reliability reproduce and erase the recorded information from the start thereof following the tape top. In this manner, the above-described disadvantages of conventional VTR's can be overcome.

In certain other embodiments of the present invention, a magnetic tape is transported from the tape top to a predetermined position after which a drum and capstan thereof are set in a stable running state, following which signals are recorded for a predetermined distance (or longer) as may be necessary to achieve stable operation when the tape is reproduced, and thereafter data to be output by the VTR is then recorded. Through the appropriate selection of the these various distances, a tape recorded by a VTR in this embodiment may be reliably reproduced and erased from and after the point at which signals are recorded on the tape regardless of which of a plurality of different VTR's is employed for this purpose.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. A video tape recorder for recording and reproducing audio and video signals in tracks on a magnetic tape, comprising:

means for recording and reproducing absolute track addresses in each of at least some of a plurality of tracks on a magnetic tape, the absolute track address of said each of at least some of the plurality of tracks corresponding to a distance of said each of at least some of the plurality of tracks from a start position of the magnetic tape, the absolute track addresses being incremented or decremented in a predetermined manner with increasing track position along a recording direction of the magnetic tape;

the recording and reproducing means being operative to record audio and video signals in the plurality of tracks; and control means for controlling the recording and reproducing means to initiate recording of the audio and video signals from a track having a predetermined absolute track address corresponding to a predetermined distance from the start position of the magnetic tape, while preventing recording of any audio and video signals by the recording and reproducing means at any location on the tape preceding the predetermined absolute track address;

the control means being further operative to control the recording and reproducing means to record at least one absolute track address at a position on the magnetic tape preceding the predetermined absolute track address.

2. The video tape recorder of claim 1, wherein the recording and reproducing means comprises a head drum and the predetermined absolute track address is selected to correspond to a maximum one of a plurality of head drum contact position to tape start position distances each characteristic of a corresponding video tape recorder within a predetermined set of video tape recorders each having a respectively different tape drive means.

3. The video tape recorder of claim 1, wherein the recording and reproducing means is operative to record a respective signal in said each of at least some of the plurality of tracks indicating whether the absolute track address thereof is valid.

4. The video tape recorder of claim 3, wherein the recording and reproducing means is operative to record said respective signal indicating an invalid absolute track address in a track preceded by an unrecorded portion of the magnetic tape along the recording direction thereof.

5. The video tape recorder of claim 1, wherein the recording and reproducing means is operative to record digital video and audio signals at first predetermined positions within each of a plurality of tracks from the track having said predetermined absolute track address, and is further operative to record said absolute track addresses in second predetermined positions within at least some of the plurality of tracks from the track having said predetermined absolute track address.

* * * * *